US011412395B2

(12) United States Patent
Maca et al.

(10) Patent No.: US 11,412,395 B2
(45) Date of Patent: Aug. 9, 2022

(54) INTEGRATED INTERMODULATION DETECTION SUB-SYSTEM FOR TELECOMMUNICATIONS SYSTEMS

(71) Applicant: ANDREW WIRELESS SYSTEMS GMBH, Buchdorf (DE)

(72) Inventors: Gregory Allan Maca, Lynchburg, VA (US); Udo-Michael Vetter, Bohmenkirch (DE)

(73) Assignee: Andrew Wireless Systems GmbH, Buchdorf (DE)

(*) Notice: Subject to any disclaimer, the term of this patent is extended or adjusted under 35 U.S.C. 154(b) by 515 days.

(21) Appl. No.: 14/676,275

(22) Filed: Apr. 1, 2015

(65) Prior Publication Data
US 2015/0223083 A1 Aug. 6, 2015

Related U.S. Application Data

(63) Continuation of application No. 13/978,966, filed as application No. PCT/US2012/055793 on Sep. 17, 2012, now Pat. No. 9,036,486.
(Continued)

(51) Int. Cl.
*H04W 24/06* (2009.01)
*H04B 7/02* (2018.01)
(Continued)

(52) U.S. Cl.
CPC ............ *H04W 24/06* (2013.01); *H04B 7/022* (2013.01); *H04B 7/15* (2013.01); *H04B 17/0085* (2013.01);
(Continued)

(58) Field of Classification Search
CPC ...... H04W 24/06; H04W 84/047; H04B 7/15; H04B 7/022; H04B 17/0085; H04B 17/11;
(Continued)

(56) References Cited

U.S. PATENT DOCUMENTS 4,918,684 A 4/1990 Boschet et al.
5,353,332 A 10/1994 Raith et al.
(Continued)

FOREIGN PATENT DOCUMENTS

CN 101572903 11/2009
CN 101610135 12/2009
(Continued)

OTHER PUBLICATIONS

European Patent Office, "Extended European Search Report for EP Application No. 16150415.4", "from Foreign Counterpart to U.S. Appl. No. 13/978,966", dated Apr. 15, 2016, pp. 1-10, Published in: EP.
(Continued)

*Primary Examiner* — Charles C Jiang
*Assistant Examiner* — Voster Preval
(74) *Attorney, Agent, or Firm* — Fogg & Powers LLC

(57) ABSTRACT

Certain aspects are directed to an intermodulation detection sub-system. The intermodulation detection sub-system includes a test signal generation module, at least one intermodulation detection device, and a controller. The test signal generation module is integrated into a unit of a telecommunications system. The test signal generation module is configured to provide a test signal to a remote antenna unit of the telecommunications system. The intermodulation detection device is integrated into the telecommunications system. The intermodulation detection device is configured to detect intermodulation products generated by mixing a first signal component and a second signal component of the test signal. The controller is integrated into the unit. The controller is configured to control the test signal generation module and the at least one intermodulation detection device.

20 Claims, 10 Drawing Sheets

Related U.S. Application Data

(60) Provisional application No. 61/637,382, filed on Apr. 24, 2012, provisional application No. 61/535,520, filed on Sep. 16, 2011.

(51) Int. Cl.

| | | |
|---|---|---|
| H04B 7/15 | (2006.01) | |
| H04B 17/11 | (2015.01) | |
| H04B 17/327 | (2015.01) | |
| H04B 17/00 | (2015.01) | |
| H04B 17/19 | (2015.01) | |
| H04B 17/17 | (2015.01) | |
| H04L 43/50 | (2022.01) | |
| H04B 17/14 | (2015.01) | |
| H04B 7/022 | (2017.01) | |
| H04W 84/04 | (2009.01) | |

(52) U.S. Cl.
CPC ............ *H04B 17/11* (2015.01); *H04B 17/14* (2015.01); *H04B 17/17* (2015.01); *H04B 17/19* (2015.01); *H04B 17/327* (2015.01); *H04L 43/50* (2013.01); *H04W 84/047* (2013.01)

(58) Field of Classification Search
CPC ........ H04B 17/14; H04B 17/17; H04B 17/19; H04B 17/327; H04L 43/50
See application file for complete search history.

(56) References Cited

U.S. PATENT DOCUMENTS

| | | | |
|---|---|---|---|
| 5,507,007 | A | 4/1996 | Gunmar et al. |
| 5,548,820 | A | 8/1996 | Victorin |
| 5,574,466 | A | 11/1996 | Reed et al. |
| 5,594,350 | A | 1/1997 | Koizumi et al. |
| 5,682,256 | A | 10/1997 | Motley et al. |
| 5,691,729 | A | 11/1997 | Jutman et al. |
| 5,694,082 | A | 12/1997 | Schmidt |
| 5,748,001 | A | 5/1998 | Cabot |
| 5,909,642 | A | 6/1999 | Suzuki |
| 6,009,129 | A | 12/1999 | Kenney et al. |
| 6,047,199 | A | 4/2000 | Demarco |
| 6,128,470 | A | 10/2000 | Naidu |
| 6,128,500 | A | 10/2000 | Raghavan et al. |
| 6,144,692 | A | 11/2000 | Beck |
| 6,366,776 | B1 | 4/2002 | Wright et al. |
| 6,418,327 | B1 | 7/2002 | Carey et al. |
| 6,646,449 | B2 | 11/2003 | Seppinen et al. |
| 6,708,036 | B2 | 3/2004 | Proctor et al. |
| 6,731,237 | B2 | 5/2004 | Gustafson et al. |
| 6,801,767 | B1 | 10/2004 | Schwartz et al. |
| 6,826,164 | B2 | 11/2004 | Mani et al. |
| 6,842,431 | B2 | 1/2005 | Clarkson et al. |
| 6,873,827 | B1 | 3/2005 | Wright |
| 6,895,247 | B2 | 5/2005 | Mostafa |
| 6,937,863 | B1 | 8/2005 | Gordon et al. |
| 6,947,472 | B2 | 9/2005 | Blessent |
| 6,996,374 | B1 | 2/2006 | Bao et al. |
| 7,013,136 | B2 | 3/2006 | Frangione et al. |
| 7,025,262 | B2 | 4/2006 | Byskov et al. |
| 7,082,320 | B2 | 7/2006 | Kattukaran et al. |
| 7,103,377 | B2 | 9/2006 | Bauman et al. |
| 7,120,546 | B2 | 10/2006 | Zyss et al. |
| 7,123,023 | B2 | 10/2006 | Minihold et al. |
| 7,127,175 | B2 | 10/2006 | Mani et al. |
| 7,127,211 | B2 | 10/2006 | Hildebrand et al. |
| 7,167,507 | B2 | 1/2007 | Mailaender et al. |
| 7,200,391 | B2 | 4/2007 | Chung et al. |
| 7,205,864 | B2 | 4/2007 | Schultz, Jr. et al. |
| 7,224,170 | B2 | 5/2007 | Graham et al. |
| 7,272,408 | B2 | 9/2007 | Dalal et al. |
| 7,286,507 | B1 | 10/2007 | Oh et al. |
| 7,313,415 | B2 | 12/2007 | Wake et al. |
| 7,394,826 | B2 | 7/2008 | Cain et al. |
| 7,403,503 | B2 | 7/2008 | Cuffaro et al. |
| 7,447,490 | B2 | 11/2008 | Cue et al. |
| 7,466,750 | B2 | 12/2008 | Kim et al. |
| 7,469,105 | B2 | 12/2008 | Wake et al. |
| 7,474,635 | B2 | 1/2009 | Linsky et al. |
| 7,603,093 | B2 | 10/2009 | Kremer et al. |
| 7,792,226 | B2 | 9/2010 | Yu et al. |
| 7,831,257 | B2 | 11/2010 | Pollman et al. |
| 7,852,951 | B2 | 12/2010 | Kalluri et al. |
| 7,876,867 | B2 | 1/2011 | Filipovic et al. |
| 7,974,244 | B2 | 7/2011 | Hermel |
| 7,983,645 | B2 | 7/2011 | Proyde et al. |
| 8,175,540 | B2 | 5/2012 | Jones |
| 8,515,339 | B2 | 8/2013 | Yona et al. |
| 8,831,593 | B2 | 9/2014 | Melester et al. |
| 9,036,486 | B2 | 5/2015 | Maca et al. |
| 9,312,895 | B1 | 4/2016 | Jupta et al. |
| 2002/0094785 | A1 | 7/2002 | Deats |
| 2003/0039319 | A1 | 2/2003 | Engelse et al. |
| 2003/0040329 | A1 | 2/2003 | Yona et al. |
| 2003/0073463 | A1 | 4/2003 | Shapira |
| 2003/0122534 | A1* | 7/2003 | Seppinen ............... H04B 1/109 324/76.51 |
| 2003/0153273 | A1 | 8/2003 | Ebert et al. |
| 2003/0157967 | A1 | 8/2003 | Saunders et al. |
| 2004/0233900 | A1* | 11/2004 | Andersen ................. H04J 1/05 370/352 |
| 2005/0102449 | A1 | 5/2005 | Durston |
| 2005/0185593 | A1* | 8/2005 | Yen .......................... H04L 1/244 370/242 |
| 2005/0259684 | A1 | 11/2005 | Csapo |
| 2005/0282506 | A1 | 12/2005 | Azuma |
| 2006/0002326 | A1 | 1/2006 | Vesuna |
| 2006/0019679 | A1 | 1/2006 | Rappaport et al. |
| 2006/0094470 | A1 | 5/2006 | Wake et al. |
| 2007/0010224 | A1 | 1/2007 | Shi |
| 2007/0135056 | A1 | 6/2007 | Kremer et al. |
| 2007/0213006 | A1 | 9/2007 | Wong et al. |
| 2007/0259625 | A1 | 11/2007 | Tolaio et al. |
| 2008/0039089 | A1 | 2/2008 | Berkman et al. |
| 2008/0198955 | A1 | 8/2008 | Oren et al. |
| 2008/0200117 | A1 | 8/2008 | Oren et al. |
| 2008/0287083 | A1 | 11/2008 | Payne, IV |
| 2008/0298445 | A1 | 12/2008 | Richardson et al. |
| 2009/0017835 | A1 | 1/2009 | Song et al. |
| 2009/0023403 | A1 | 1/2009 | LaBerge |
| 2009/0027282 | A1 | 1/2009 | Finn et al. |
| 2009/0068974 | A1* | 3/2009 | Smith ....................... H04B 1/30 455/304 |
| 2009/0086028 | A1 | 4/2009 | Miller et al. |
| 2009/0086864 | A1* | 4/2009 | Komninakis ............ H04B 1/10 455/296 |
| 2009/0168861 | A1* | 7/2009 | Marshall ................ H04W 24/02 370/320 |
| 2009/0239475 | A1 | 9/2009 | Lehman |
| 2009/0298422 | A1 | 12/2009 | Conroy et al. |
| 2010/0029237 | A1 | 2/2010 | Yamamoto et al. |
| 2010/0075709 | A1* | 3/2010 | Nakano ............... H04B 17/0085 455/67.14 |
| 2010/0085061 | A1 | 4/2010 | Bradley et al. |
| 2010/0113006 | A1 | 5/2010 | Pajjuri et al. |
| 2010/0128676 | A1 | 5/2010 | Wu et al. |
| 2010/0135437 | A1 | 6/2010 | Lee et al. |
| 2010/0142390 | A1 | 6/2010 | Sun et al. |
| 2010/0142663 | A1 | 6/2010 | Yoon et al. |
| 2010/0164504 | A1 | 7/2010 | Bradley |
| 2010/0178936 | A1 | 7/2010 | Wala et al. |
| 2010/0197238 | A1 | 8/2010 | Pathuri et al. |
| 2010/0202356 | A1 | 8/2010 | Fischer et al. |
| 2010/0248616 | A1 | 9/2010 | Karl Frederick |
| 2010/0260103 | A1 | 10/2010 | Guey et al. |
| 2010/0278530 | A1 | 11/2010 | Kummetz et al. |
| 2010/0295533 | A1 | 11/2010 | Kuga et al. |
| 2011/0051628 | A1* | 3/2011 | Cohen ....................... H04B 1/52 370/278 |
| 2011/0059709 | A1 | 3/2011 | Collins, III |
| 2011/0080847 | A1 | 4/2011 | Kenkel et al. |

(56) References Cited

U.S. PATENT DOCUMENTS

| | | |
|---|---|---|
| 2011/0085490 A1 | 4/2011 | Schlee |
| 2011/0105184 A1 | 5/2011 | Piirainen et al. |
| 2011/0135308 A1 | 6/2011 | Tarlazzi |
| 2011/0151839 A1 | 6/2011 | Bolon et al. |
| 2011/0158211 A1 | 6/2011 | Gaal et al. |
| 2011/0164878 A1 | 7/2011 | Ma et al. |
| 2011/0201269 A1 | 8/2011 | Hobbs et al. |
| 2011/0237182 A1 | 9/2011 | Stratford et al. |
| 2012/0093269 A1 | 4/2012 | Yu et al. |
| 2012/0134666 A1 | 5/2012 | Casterline et al. |
| 2012/0140685 A1* | 6/2012 | Lederer ............ H04L 25/03057 708/322 |
| 2012/0282889 A1 | 11/2012 | Tanaka et al. |
| 2012/0309328 A1* | 12/2012 | Morrison ............... H01Q 1/525 455/78 |
| 2012/0315894 A1* | 12/2012 | Dussmann ......... H04B 7/15528 455/424 |
| 2013/0017863 A1 | 1/2013 | Kummetz et al. |
| 2013/0054169 A1* | 2/2013 | Neidhardt .......... H04B 17/0085 702/69 |
| 2013/0071112 A1 | 3/2013 | Melester et al. |
| 2013/0095870 A1 | 4/2013 | Phillips et al. |
| 2013/0182753 A1* | 7/2013 | Delforce ................ G01R 23/20 375/228 |
| 2013/0260705 A1 | 10/2013 | Stratford |
| 2013/0310023 A1* | 11/2013 | Bevan .................. H04B 7/0413 455/423 |
| 2014/0024402 A1 | 1/2014 | Singh |
| 2014/0119197 A1 | 5/2014 | Maca et al. |
| 2014/0335799 A1* | 11/2014 | Morrison ............... H01Q 1/525 455/78 |
| 2015/0078191 A1 | 3/2015 | Jongren et al. |
| 2016/0337050 A1 | 11/2016 | Melester et al. |
| 2016/0352612 A1 | 12/2016 | Daniel |

FOREIGN PATENT DOCUMENTS

| | | | |
|---|---|---|---|
| CN | 101635590 | 3/2010 | |
| CN | 103733664 | 4/2014 | |
| CN | 103875270 | 6/2014 | |
| CN | 103891179 | 6/2014 | |
| EP | 1081883 | 3/2001 | |
| EP | 2661828 | 11/2013 | |
| EP | 2732653 | 5/2014 | |
| EP | 2756619 | 7/2014 | |
| HK | 1198078 | 3/2015 | |
| JP | 2002190780 | 7/2002 | |
| JP | 2005151189 | 6/2005 | |
| KR | 19980067669 | 10/1998 | |
| KR | 20020041516 | 6/2002 | |
| KR | 2005049070 | 5/2005 | |
| KR | 2006120361 | 11/2006 | |
| KR | 2007118460 | 12/2007 | |
| KR | 20070117791 | 12/2007 | |
| KR | 2008086604 | 9/2008 | |
| KR | 20090010523 | 1/2009 | |
| KR | 2009080762 | 7/2009 | |
| WO | 9739597 | 10/1997 | |
| WO | WO-9739597 A1 * | 10/1997 | ......... H04B 17/0027 |
| WO | 2005109700 | 11/2005 | |
| WO | WO 2005109700 A1 * | 11/2005 | ............. G01N 21/21 |
| WO | WO-2005109700 A1 * | 11/2005 | ............. G01N 21/21 |
| WO | 2007044653 | 4/2007 | |
| WO | 2008027213 | 3/2008 | |
| WO | 2008088862 | 7/2008 | |
| WO | 2009039396 | 3/2009 | |
| WO | 2009082084 | 7/2009 | |
| WO | 2011156465 | 12/2011 | |
| WO | 2013009835 | 1/2013 | |
| WO | 2013033199 | 3/2013 | |
| WO | 2013040579 | 3/2013 | |
| WO | 2013040589 | 3/2013 | |

OTHER PUBLICATIONS

Bell et al., "Range to Fault Technology", "http://www.livingston.co.uk/files/bestanden/rtfwhitepaper.pdf", Jan. 1, 2011, pp. 1-10, Publisher: Kaelus, Inc.

TOLSTRUP , "Noise", Indoor Radio Planning, Jul. 14, 2011, pp. 295-328.

"An Introduction to Neutral Host Distributed Antenna Systems", infinigy networks, published at least by Nov. 7, 2004, 14 pages.

"Distributed Antenna Systems and MIMO Technology", TE Connectivity Wireless and Services, Apr. 2011, 8 pages.

U.S. Appl. No. 13/621,504 , Non-Final Office Action, dated Feb. 13, 2014, 28 pages.

U.S. Appl. No. 13/621,504 , Notice of Allowance, dated Jun. 18, 2014, 7 pages.

U.S. Appl. No. 13/978,966 , Non-Final Office Action, dated Sep. 5, 2014, 32 pages.

U.S. Appl. No. 13/978,966 , Non-Final Office Action, dated Apr. 15, 2014, 34 pages.

U.S. Appl. No. 13/978,966 , Notice of Allowance, dated Jan. 21, 2015, 9 pages.

Bell et al., "Range to Fault Technology", http://www.livingston.co.uk/files/bestanden/rtfwhitepaper.pdf, Jan. 1, 2011, Kaelus Inc., 10 pages.

Brahmanapally et al., "Analysis and determination of intermodulation hits in mobile communication", Proceedings of the 8th WSEAS International Conference on Data Networks, Communications, Computers, DNCOCO '09, Nov. 7-9, 2009, pp. 130-137, World Scientific and Engineering Academy and Society (1 page; abstract only).

Chalmers , "Detecting and correcting intermodulation", Global Communications, 1985, pp. 22-25, vol. 7, Issue 1, Global Communications , US (1 page; abstract only).

Office Action dated Dec. 3, 2014 on related Chinese Patent Application 201280050939.8, 11 pages.

European Patent Application No. 12832171.8 , Extended European Search Report dated Apr. 24, 2014, 9 pages.

Feng et al., "Downlink Capacity of Distributed Antenna Systems in a Multi-Cell Environment", Communications and Networking, Sep. 2010, pp. 173-186, Sciyo, Croatia, 14 pages.

Heath, Jr. et al., "Multiuser MIMO in Distributed Antenna Systems", Signals, Systems and Computers (ASILOMAR), 2010 Conference Record of the Forty Fourth Asilomar Conference, Nov. 2010, 5 pages.

NASH , "Intermodulation Distortion Problems at UMTS Cell Sites", Aeroflex Wireless Test Solutions, Burnham, UK (http://www.aeroflex.com/ats/products/prodfiles/articles/8814/Intermod.pdf), Published at least by Jan. 3, 2010, pp. 1-10.

International Patent Application No. PCT/US2012/055793 , International Search Report and Written Opinion, dated Dec. 28, 2012, 9 pages.

International Patent Application No. PCT/US2012/055807 , International Search Report and Written Opinion, dated Dec. 26, 2012, 9 pages.

Qiang et al., "Study on Computer-Based Integrated Passive Inter-Modulation Measurement System", Chinese Journal of Scientific Instrument, Jul. 2009, pp. 1540-1545, vol. 30, Issue 7, China Publications Center, China (2 pages; abstract only).

Singh et al., "Systems Methodology for PIM Mitigation of Communications Satellites", Proceedings of the 4th International Workshop on Multipactor, Corona and Passive Intermodulation in Space RF Hardware, Sep. 8-11, 2003, ESTEC, Noordwijk, Netherlands (11 pages).

* European Patent Application No. 12832171.8, Office Action dated Feb. 13, 2015, 6 pages.

United States Patent and Trademark Office, "Notice of Allowance", "From U.S. Appl. No. 14/428,254", dated Jun. 26, 2017, pp. 1-27, Published in: U.S.

United States Patent and Trademark Office, "Office Action", "From U.S. Appl. No. 14/448,080", dated Jun. 30, 2017, pp. 1-42, Published in: U.S.

(56) References Cited

OTHER PUBLICATIONS

United States Patent and Trademark Office, "Office Action", "From U.S. Appl. No. 15/220,147", dated Jul. 6, 2017, pp. 1-51, Published in: U.S.
United States Patent and Trademark Office, "Final Office Action", "from U.S. Appl. No. 13/546,425", dated Feb. 24, 2015, pp. 1-27, Published in: U.S.
United States Patent and Trademark Office, "Office Action", "from U.S. Appl. No. 13/546,425", dated Jul. 31, 2014, pp. 1-27, Published in: U.S.
International Searching Authority, "International Preliminary Report on Patentability from PCT Application No. PCT/US2012/046207", "from Foreign Counterpart to U.S. Appl. No. 13/546,425", dated Jan. 23, 2014, pp. 1-7, Qublished in: WO.
International Searching Authority, "International Search Report for PCT Application No. PCT/US2012/046207", "from Foreign Counterpart to U.S. Appl. No. 13/546,425", dated Nov. 15, 2012, pp. 1-9, Published in: WO.
International Search Authority, "International Search Report for PCT Application No. PCT/US2012/052845", "from Foreign Counterpart to U.S. Appl. No. 13/597,900", dated Jan. 30, 2013, pp. 1-8, Published in: WO.
European Patent Office, "Communication under Rule 71(3) for EP Application No. 12832171.8", "from Foreign Counterpart to U.S. Appl. No. 13/978,966", dated Sep. 25, 2015, pp. 1-108, Published in: EP.
European Patent Office, "Communication under Rule 71(3) EPC for EP Application No. 16150415.4", "from Foreign Counterpart to U.S. Appl. No. 13/978,966", dated Apr. 4, 2017, pp. 1-58, Published in: EP.
International Search Authority, "International Preliminary Report on Patentability for PCT/US2012/055793", "from Foreign Counterpart to U.S. Appl. No. 13/978,966", dated Mar. 27, 2014, pp. 1-6, Published in: WO.
United States Patent and Trademark Office, "Notice of Allowance", "from U.S. Appl. No. 14/428,254", dated Mar. 2, 2017, pp. 1-7, Published in: U.S.
United States Patent and Trademark Office, "Office Action", "from U.S. Appl. No. 14/428,254", dated Oct. 6, 2016, pp. 1-21, Published in: U.S.
International Searching Authority, "International Search Report and Written Opinion for PCT Application No. PCT/EP2012/003849", "from Foreign Counterpart to U.S. Appl. No. 14/428,254", dated May 24, 2013, pp. 1-10, Qublished in: WO.
Australian Patent Office, "Notice of Acceptance for AU Application No. 2012308170", "from Foreign Counterpart to U.S. Appl. No. 13/621,504", dated Feb. 14, 2017, pp. 1-3, Published in: AU.
Australian Patent Office, "Office Action for AU 2012308170", "from Foreign Counterpart to U.S. Appl. No. 13/621,504", dated Feb. 11, 2016, pp. 1-4, Published in: AU.
China Patent Office, "Notice of Allowance for CN Application No. 201280050939.8", "from Foreign Counterpart to U.S. Appl. No. 13/621,504", dated Jun. 19, 2015, pp. 1-3, Published in: CN.
European Patent Office, "Partial European Search Report for EP Application No. 12832025.6", "from Foreign Counterpart to U.S. Appl. No. 13/621.504", dated Mar. 12, 2015, pp. 1-7, Published in: EP.
European Patent Office, "Extended European Search Report for EP Application No. EP12832025.6", "from Foreign Counterpart to U.S. Appl. No. 13/621,504", dated Jul. 2, 2015, pp. 1-12, Published in: EP.
European Patent Office, "Communication under Rule 71(3) for EP Application No. 12832025.6", "from Foreign Counterpart to U.S. Appl. No. 13/621,504", dated Oct. 6, 2016, pp. 1-46, Published in: EP.
European Patent Office, "Office Action for EP Application No. 12832025.6", "from Foreign Counterpart to U.S. Appl. No. 13/621,504", dated May 10, 2016, pp. 1-4, Published in: EP.

European Patent Office, "Partial European Search Report for EP Application No. 17159252.4", "from Foreign Counterpart to U.S. Appl. No. 13/621,504", dated Mar. 27, 2017, pp. 1-9, Published in: EP.
European Patent Office, "Extended European Search Report for EP Application No. 17159062.3", "from Foreign Counterpart to U.S. Appl. No. 13/621,504", dated Mar. 28, 2017, pp. 1-12, Published in: EP.
United States Patent and Trademark Office, "Notice of Allowance", "from U.S. Appl. No. 13/621,504", dated Jun. 18, 2014, pp. 1-7, Published in: U.S.
United States Patent and Trademark Office, "Advisory Action", "from U.S. Appl. No. 14/448,080", dated Jan. 26, 2017, pp. 1-14, Published in: U.S.
United States Patent and Trademark Office, "Final Office Action", "from U.S. Appl. No. 14/448,080", dated Nov. 10, 2016, pp. 1-29, Published in: U.S.
United States Patent and Trademark Office, "Office Action", "from U.S. Appl. No. 14/448,080", dated Jun. 15, 2016, pp. 1-33, Published in: U.S.
International Search Authority, "International Preliminary Report on Patentability", "from International Application No. PCT/US2012/055807", dated Mar. 27, 2014, pp. 1-6, Published in: WO.
AVITEC, Rolling Out One Seamless 3G Network, retrieved from the Internet at http://www.intercomms.net/FEB04/content/avitec.php, at least as early as Aug. 24, 2011, 4 pages.
AVITEC, "Rolling out one seamless 3G network—no longer a challenge", "http://www.intercomms.net/FEB04/content/avitec.php", pp. 1-4, captured by Internet Archive on May 2, 2004, retrieved from the Internet at https://web.archive.org/web/20040502041952/http://www.intercomms.net:80/FEB04/content/avitec.php on Jun. 1, 2017.
European Patent Application No. EP12826731.7 , Extended European Search Report, dated Mar. 12, 2015, 10 pages.
United States Patent and Trademark Office, "Final Office Action", "From U.S. Appl. No. 14/448,080", dated Nov. 24, 2017, pp. 1-30, Published in: U.S.
United States Patent and Trademark Office, "Notice of Allowance", "From U.S. Appl. No. 14/428,254", dated Oct. 2, 2017, pp. 1-9, Published in: U.S.
European Patent Office, "Extended European Search Report from EP Application No. 17159052.4", "from Foreign Counterpart of U.S. Appl. No. 13/621,504", dated Jul. 3, 2017, pp. 1-15, Published in: U.S.
European Patent Office, "Communication pursuant to Article 94(3) EPC for EP Application No. 17159062.3", Foreign Counterpart to U.S. Appl. No. 13/621,504, dated Mar. 12, 2018, pp. 1-7, Published in: EP.
European Patent Office, "Communication pursuant to Article 94(3) EPC for EP Application No. 17159052.4", "Foreign Counterpart to U.S. Appl. No. 13/621,504", dated Mar. 12, 2018, pp. 1-7, Published in: EP.
IP Australia, "Examination Report No. 1 for Standard Application No. 2017202008 dated Apr. 16, 2018", "Foreign Counterpart to U.S. Appl. No. 13/621,504", dated Apr. 16, 2018, pp. 1-4, Published in: AU.
U.S. Patent and Trademark Office, "Office Action for U.S. Appl. No. 15/220,147", dated Apr. 2, 2018, pp. 1-31, Published in: U.S.
U .S. Patent and Trademark Office, "Notice of Allowance for U.S. Appl. No. 14/448,080", dated Jun. 28, 2018, pp. 1-13, Published in: U.S.
United States Patent and Trademark Office, "Advisory Action for U.S. Appl. No. 14/448,080", dated Mar. 2, 2018, pp. 1-12, Published in: U.S.
U.S. Patent and Trademark Office, "Notice of Allowance for U.S. Appl. No. 15/877,305", dated Sep. 4, 2018, pp. 1-9, Published in: U.S.
European Patent Office, "Communication pursuant to Article 94(3) EPC for EP Application No. 17159052.4 dated Oct. 10, 2018", From Foreign Counterpart of U.S. Appl. No. 13/621,504; pp. 1-7; Published in EP.

(56) References Cited

OTHER PUBLICATIONS

European Patent Office, "Communication pursuant to Article 94(3) EPC for EP Application No. 17159062.3 dated Oct. 10, 2018" From Foreign Counterpart of U.S. Appl. No. 13/621,504; pp. 1-5; Published in EP.
United States Patent and Trademark Office, "Final Office Action from U.S. Appl. No. 15/220,147 dated Nov. 5, 2018"; pp. 1-22; Published in U.S.

\* cited by examiner

INTEGRATED INTERMODULATION DETECTION SUB-SYSTEM FOR TELECOMMUNICATIONS SYSTEMS

CROSS-REFERENCE TO RELATED APPLICATIONS

This application is a continuation of U.S. patent application Ser. No. 13/978,966 filed Jul. 10, 2013 and titled "Integrated Intermodulation Detection Sub-System for Telecommunications Systems", now allowed, which is a U.S. National Phase of PCT International Application No. PCT/US2012/055793 filed Sep. 17, 2012 and titled "Integrated Intermodulation Detection Sub-System for Telecommunications Systems", which claims the benefit of U.S. Provisional Application Ser. No. 61/535,520 filed Sep. 16, 2011 and titled "Integrated Passive Intermodulation Measurement Sub-System for Telecommunications Systems", and U.S. Provisional Application Ser. No. 61/637,382 filed Apr. 24, 2012 and titled "Intermodulation Detection Sub-System for Distributed Antenna System", the contents of each of which are hereby incorporated by reference.

TECHNICAL FIELD

This disclosure relates generally to signal processing in telecommunications systems and more particularly relates to detecting intermodulation products in telecommunications systems, such as distributed antenna systems.

BACKGROUND

A telecommunications system, such as a distributed antenna system ("DAS"), can provide signal coverage to coverage zones in which wireless devices are located. Signals communicated via a DAS or other telecommunications system can include signal components, such as passive intermodulation ("PIM") products or other intermodulation products, that distort the signals being communicated. Intermodulation products can result from the undesired mixing of signals in a telecommunications system. Intermodulation products can be generated from two tones at different frequencies (e.g., $f_1$ and $f_2$) encountering a non-linear discontinuity or other non-linear interface in a telecommunications system. Examples of a non-linear discontinuity or other non-linear interfaces can include junctions of dissimilar metals in components of a signal path, such as the connections between an antenna and a transmitter. The intermodulation products can include signals having frequencies that are related to the frequencies of the original tones by the relationship $$f_n = \frac{n+1}{2}f_1 - \frac{n-1}{2}f_2,$$

where $n=\pm 3, \pm 5, \pm 7 \ldots$ and is the order of the intermodulation product, $f_1$, is the frequency of the lower tone and $f_2$ is the frequency of the higher tone. For example, $f_3 = 2 \times f_1 - f_2$ and is the frequency of a third order intermodulation product at a frequency below the frequencies of the two tones. Additionally, $f_{-3} = 2 \times f_2 - f_1$ and is the frequency of a third order intermodulation product at a frequency above the frequencies of the two tones. The presence of these intermodulation products can indicate that intermodulation is present in the telecommunications subsystem.

A PIM measurement device that is not integral to or otherwise integrated with a telecommunications system can be used to measure PIM products of individual system components before installing each component in the system. This solution does not, however, allow for detecting and measuring the PIM products of an operational telecommunications system once the individual system components have been installed.

Accordingly, it is desirable to detect and measure intermodulation products in a telecommunications system subsequent to installation.

SUMMARY

In one aspect, an intermodulation detection sub-system is provided. The intermodulation detection sub-system includes a test signal generation module, at least one intermodulation detection device, and a controller. The test signal generation module is integrated into a unit of a telecommunications system. The test signal generation module is configured to provide a test signal to a remote antenna unit of the telecommunications system. The intermodulation detection device is integrated into the telecommunications system. The intermodulation detection device is configured to detect intermodulation products generated by mixing a first signal component and a second signal component of the test signal. The controller is integrated into the unit. The controller is configured to control the test signal generation module and the at least one intermodulation detection device.

In another aspect, an intermodulation detection sub-system is provided. The intermodulation detection sub-system includes a test signal generation module, an power measurement device, and a controller. The test signal generation module is integrated into a unit of a telecommunications system. The test signal generation module is configured to provide a test signal to a remote antenna unit of the telecommunications system. The power measurement device is integrated into the remote antenna unit. The power measurement device is configured to detect intermodulation products generated by mixing a first signal component and a second signal component of the test signal. The controller is integrated into the unit. The controller is configured to control the test signal generation module and the at least one power measurement device.

In another aspect, an intermodulation detection sub-system is provided. The intermodulation detection sub-system includes a test signal generation module that includes a first buffer, a second buffer, and a processor. The first buffer is communicatively coupled to a downlink path of a telecommunications system. The test signal generation module is configured to provide a test signal to the downlink path. The second buffer is communicatively coupled to an uplink path of the telecommunications system. The second buffer is configured to generate an uplink digital data set from an uplink signal traversing the uplink path. The processor is communicatively coupled to the first buffer and the second buffer. The processor is configured to detect an intermodulation product in an uplink signal traversing the uplink path by correlating a model intermodulation product and the uplink digital data set from the second buffer. The model intermodulation product is generated based on a test digital data set from the first buffer that represents the test signal.

DETAILED DESCRIPTION

Figure 1:
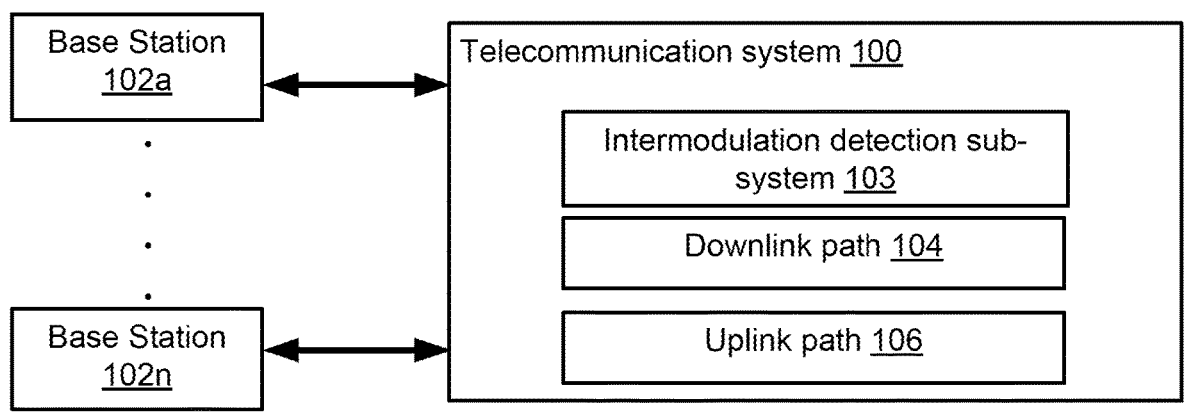
FIG. 1 is a block diagram of a telecommunications system having an integrated intermodulation detection sub-system according to one aspect.

Certain aspects and examples are directed to an intermodulation detection sub-system that can be disposed in a telecommunications system, such as a distributed antenna system ("DAS"). Downlink signals communicated via the telecommunications system can induce passive intermodulation ("PIM") products at frequencies in the uplink frequency band that can be recovered by the remote antenna unit. The PIM products recovered by a remote antenna unit can distort uplink signals from wireless devices. The intermodulation detection sub-system can detect and/or measure PIM products and other intermodulation products. Integrating a PIM measurement sub-system into a telecommunications system can include disposing the components of the PIM measurement sub-system within one or more components of the telecommunications system. Using an integrated intermodulation detection sub-system can obviate the need for a separate, non-integral PIM measurement device.

In some aspects, the integrated sub-system can actively detect PIM products using test signals. The PIM measurement sub-system can include a controller, a test signal generator, and a PIM measurement device for actively detecting PIM products. The test signal generator can generate a test signal for measuring PIM products and provide the test signal to a downlink path of the telecommunications system. The test signal can include signal components at frequencies selected by the controller such that a linear combination of the first and second frequencies, such as (but not limited to) the sum or difference of the frequencies, is a frequency in the uplink frequency band. If the test signal encounters a non-linear interface, PIM products can be generated from the signal components of the test signal mixing at the non-linear interface. PIM products generated in the downlink path can be recovered by a receiving antenna and provided to the uplink path.

In some aspects, a PIM measurement device, such as a power meter, included in one or more components of the telecommunication system can detect and measure the PIM products in the uplink path. The power meter can measure PIM products in signals received via test probes coupled to uplink paths. Examples of a power meter can include a logarithmic ("LOG") detector or a root mean square ("RMS") detector. In other aspects, PIM products can be detected by correlating a model intermodulation product and an uplink digital data set that digitally represents an uplink signal including the intermodulation products. A model intermodulation product can include a data set that is mathematically derived from a test digital data set that digitally represents the test signal. For example, a model intermodulation product may be a digital representation of a linear combination of the first and second frequencies of a test signal. A PIM measurement device can include a capture buffer configured to store the uplink digital data set. The capture buffer can be synchronized with a signal generation module generating the test digital data set. The controller can mathematically correlate model intermodulation product with the uplink digital data set. Mathematically correlating the model intermodulation product with the uplink digital data set can indicate the presence of the intermodulation product in the uplink signal.

In additional or alternative aspects, the intermodulation detection sub-system can perform passive detection of PIM products. The intermodulation detection sub-system can include a downlink capture module coupled to the downlink path and an uplink capture module coupled to the uplink path. The downlink capture module can receive a downlink signal from the downlink path and convert the downlink signal to a downlink digital data set representing the downlink signal. The uplink capture module can receive a uplink signal from the uplink path and convert the uplink signal to an uplink digital data set representing the uplink signal. The intermodulation-modeling module can apply a non-linear function, which models the generation of an intermodulation product from the downlink signal, to the downlink digital data set to generate a model intermodulation product. The processor can cross correlate the model intermodulation product with the uplink digital data set to determine that a mathematical correlation exists between the model intermodulation product and the uplink digital data set, thereby indicating the presence and signal power of an intermodulation product in the uplink path.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 depicts an intermodulation detection sub-system 103 integrated into a telecommunications system 100. Integrating the intermodulation detection sub-system 103 in the telecommunications system 100 can include disposing some or all components of the intermodulation detection sub-system 103 enclosed within one or more communication devices of the telecommunication system 100. The telecommunications system 100 in FIG. 1 also includes a downlink path 104 and an uplink path 106. The downlink path 104 can be a signal path including one or more devices for communicating downlink signals received from a base station to wireless devices serviced by the telecommunication system 100. Downlink signals are signals at frequencies in a downlink frequency band provided from one or more base stations 102a-n to a remote antenna unit for radiation to wireless devices. The uplink path 106 can be a signal path including one or more devices for communicating uplink signals received from wireless devices to one or more base stations 102a-n. Uplink signals can include signals received from wireless devices in the coverage zones serviced by remote antenna units of the telecommunication system 100. The intermodulation detection sub-system 103 can detect and measure PIM products in signals traversing the downlink path 104 and/or the uplink path 106.

Figure 2:
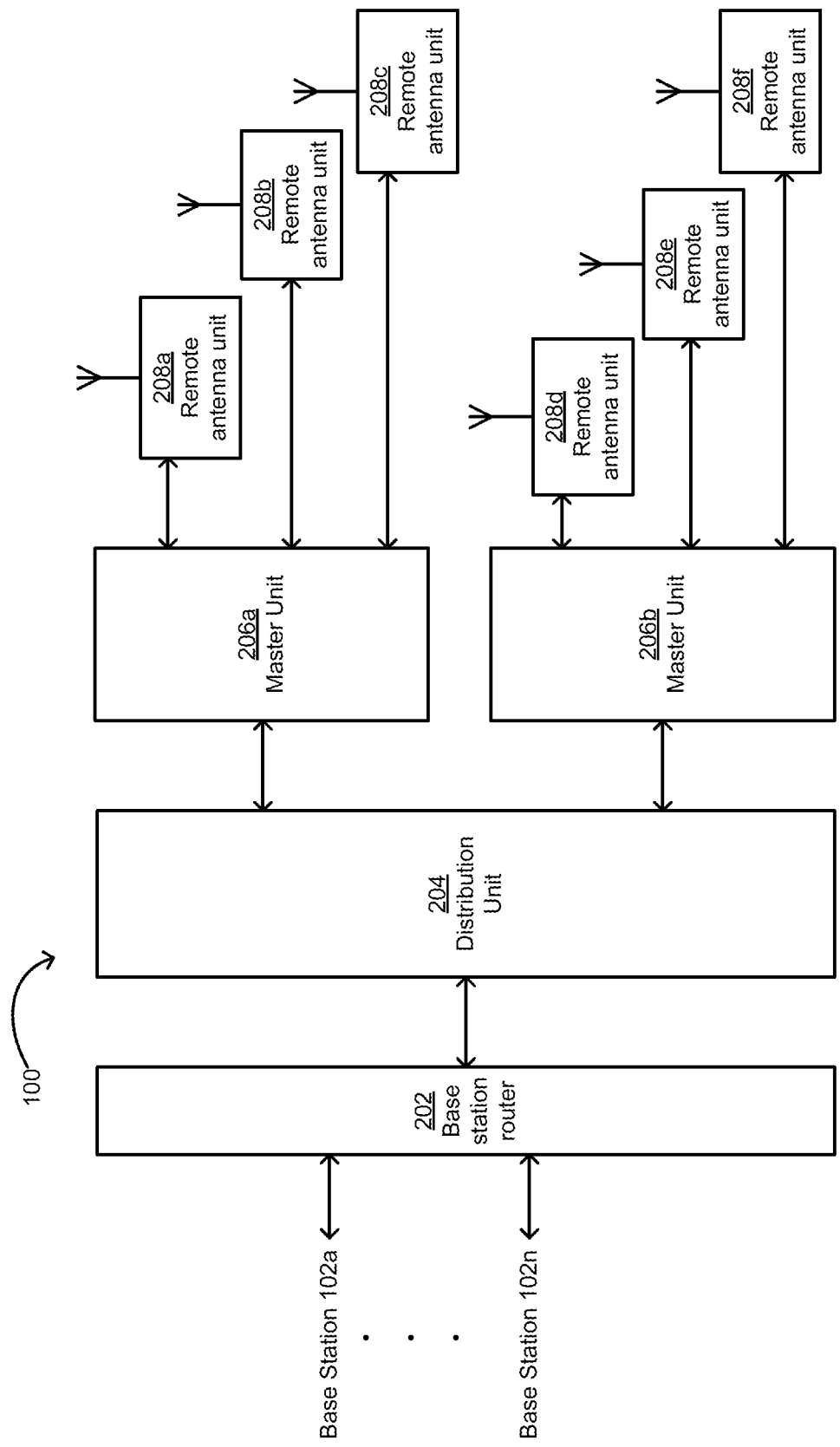
FIG. 2 is a schematic view of an example telecommunications system in which an intermodulation detection sub-system can be integrated according to one aspect.

FIG. 2 depicts an example telecommunications system 100 having a base station router 202 in communication with base stations 102a-n and a distribution unit 204. The telecommunications system 100 can also include master units 206a, 206b in communication with the distribution unit 204 and the remote antenna units 208a-f. The telecommunications system 100 can be positioned in an area to extend wireless communication coverage or to facilitate other telecommunication functions.

In the direction of a downlink path 104, the telecommunications system 100 can receive downlink signals from the base stations 102a-n via a wired or wireless communication medium. Downlink signals can be received by the base station router 202. The base station router 202 can provide the downlink signals to the master units 206a, 206b via the distribution unit 204. The master units 206a, 206b can communicate with the distribution unit 204 via any communication medium capable of carrying signals between the distribution unit 204 and the master units 206a, 206b. Examples of a suitable communication medium include copper wire (such as a coaxial cable), optical fiber, and microwave or optical link. The link can transport the signals in analog or in digitized form. In some aspects, the master units can communicate directly with the base station router 202.

The master units 206a, 206b can provide downlink signals to the remote antenna units 208a-f. The remote antenna units 208a-f can communicate with the master units 206a, 206b via any communication medium capable of carrying signals between the master units 206a, 206b and the remote antenna units 208a-f. Examples of a suitable communication medium include copper wire (such as a coaxial cable), optical fiber, and microwave or optical link. The link can transport the signals in analog or in digitized form. The remote antenna units 208a-f can radiate the signals of the sector(s) distributed to the physical area.

In the direction of an uplink path 106, the base station router 202 can receive uplink signals from remote antenna units 208a-f via the master units 206a, 206b and the distribution unit 204.

An intermodulation detection sub-system 103 can be integrated into the telecommunications system 100 depicted in FIG. 2. One or more component of the intermodulation detection sub-system 103 can be disposed in one or more of the components of the telecommunications system 100.

Intermodulation Detection Sub-System in Base Station Router

Figure 3:
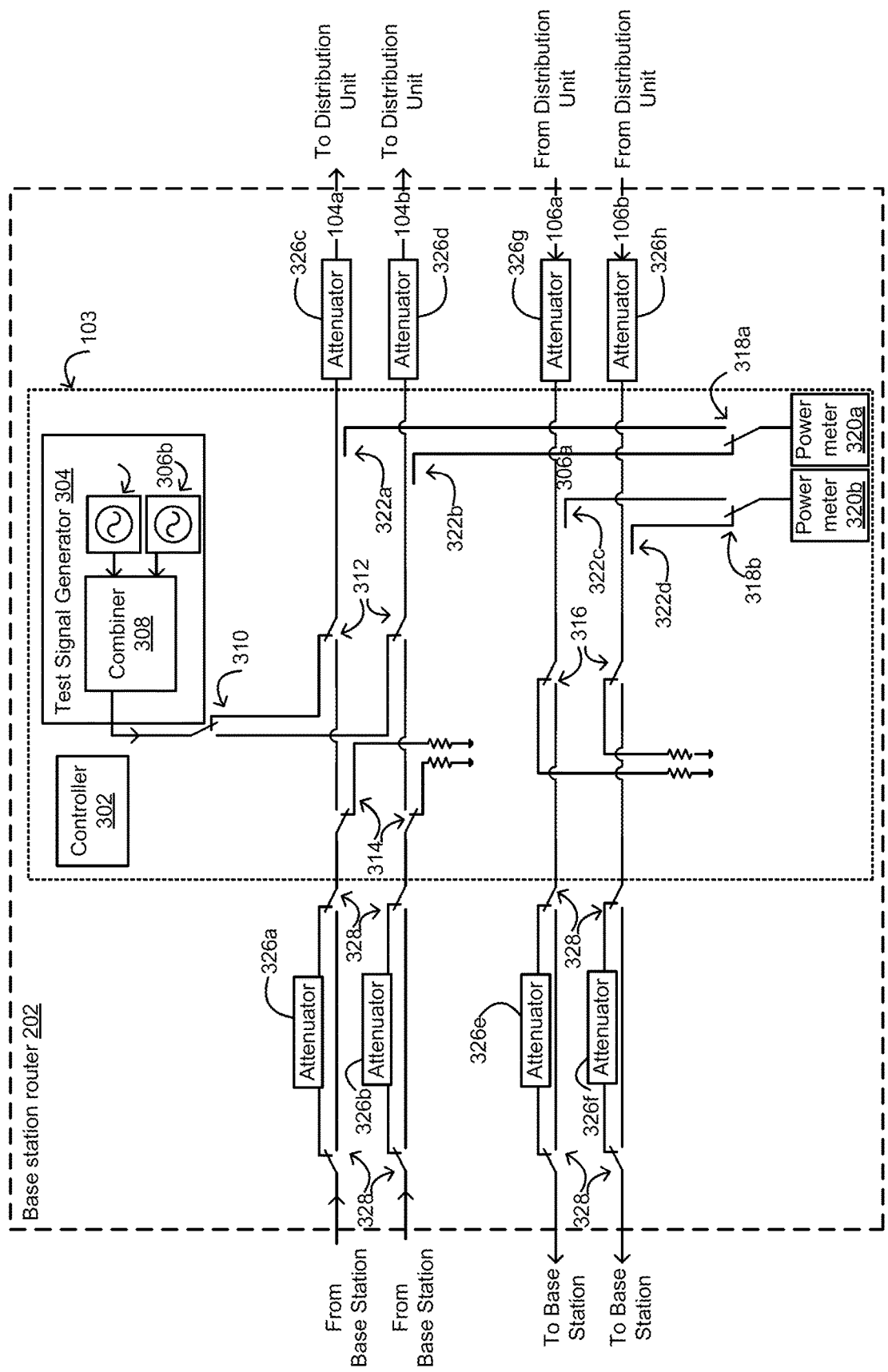
FIG. 3 is a schematic view of a base station router with a test signal generator of an intermodulation detection sub-system according to one aspect.

FIG. 3 depicts an example of a base station router 202 in which an intermodulation detection sub-system 103 is integrated. The intermodulation detection sub-system 103 can include a controller 302, a test signal generator 304, a path switch 310, test switches 312, terminating switches 314, protection switches 316, detector switches 318a, 318b, power meters 320a, 320b, and test probes 322a-d. Although the base station router 202 is depicted as having two downlink paths 104a, 104b and two uplink paths 106a, 106b, the base station router 202 can include any number of uplink and downlink paths, including one of each.

The controller 302 can configure the components of the intermodulation detection sub-system 103. Configuring the components of the intermodulation detection sub-system 103 can include modifying operation of a component within the telecommunication system 100 or otherwise causing a change in the state of a component. The controller 302 can configure the components by, for example, generating control signals and transmitting control signals to the respective components. An example of a controller 302 is a Peripheral Interface Controller ("PIC"). The controller 302 can communicate with the components of the intermodulation detection sub-system 103 integrated into the base station router 202 via, for example, a printed circuit board. The controller 302 can communicate with components of the intermodulation detection sub-system 103 disposed elsewhere in the telecommunications system 100 (e.g., in the master units, the remote antenna units, etc.) using control signals communicated via the downlink paths 104a, 104b and uplink paths 106a, 106b.

In additional or alternative aspects, the controller 302 can communicate with components of the intermodulation detection sub-system 103 disposed elsewhere in the telecommunications system 100 using control signals communicated via a control path. The control path can be any communication medium suitable for wired or wireless communication between components of the intermodulation detection sub-system 103. Examples of a suitable communication medium include copper wire (such as a coaxial cable), optical fiber, and microwave or optical link.

The test signal generator 304 can include signal sources 306a, 306b and a combiner 308. A signal source can be, for example, an analog signal generator capable of producing continuous wave tones. The combiner 308 can combine signals from each of the signal sources 306a, 306b to output a combined test signal. In some aspects, combining the signals can include summing or adding signals. The controller 302 can be used to configure the signal sources 306a, 306b to select the frequencies of the signals from the signal sources 306a, 306b. The frequencies of the two test signal can be selected such that a linear combination of the test signal frequencies is a frequency in the uplink frequency band. In some aspects, the test signal generator 304 may be integrated in a PIM measurement device, which may be integrated in a remote antenna unit. In additional or alternative aspects, the test signal generator 304 may use n-tone stimulation (e.g. triple beat measurement) or use two tones in different downlink paths.

The test signal generator 304 can provide a combined test signal to the downlink paths 104a, 104b via the path switch 310 and the test switches 312. The path switch 310 can be used to select either of downlink paths 104a, 104b to receive the combined test signal. The test switches 312 can be used to couple the path switch 310 to either of the downlink paths 104a, 104b.

The PIM products for the telecommunications system 100 can be detected and measured by configuring the telecommunications system 100 for testing. In test mode, the controller 302 can configure the intermodulation detection sub-system 103 to couple one or both of the downlink paths 104a, 104b to the path switch 310 via one or both of the test switches 312. The controller 302 can configure the intermodulation detection sub-system 103 to terminate the input from the base stations to the downlink paths 104a, 104b. Terminating the input from the base stations to the downlink paths 104a, 104b can include coupling the base stations via the terminating switches 314 to terminating resistive loads, each depicted in FIG. 3 as a resistor coupled to ground. The controller 302 can also configure the intermodulation detection sub-system 103 to ground the output of one or both of the uplink paths 106a, 106b by coupling the uplink paths 106a, 106b to terminating resistive loads via the protection switches 316.

The power meter 320a can measure the power of signals received by test probes 322a, 322b in the downlink paths 104a, 104b, respectively. The power meter 320a can measure the power of the combined test signal provided by the test signal generator 304. The power meter 320a can be, for example, a logarithmic ("LOG") detector or a root mean square ("RMS") detector. The controller 302 can configure the detector switch 318a to couple the power meter 320a to either of the test probes 322a, 322b.

If the combined test signal encounters a non-linear interface in the downlink path or the uplink path, PIM products can be generated from the mixing of the signal components of the test signal at the non-linear interface. Such undesirable mixing can occur in the downlink path or the uplink path. The PIM products can be transmitted and recovered by a remote antenna unit and provided to the uplink paths 106a, 106b.

The power meter 320b can measure, at the base station router 202, PIM products in signals received by the test probes 322c, 322d in the uplink paths 106a, 106b, respectively. The power meter 320b can be, for example, a logarithmic ("LOG") detector or a root mean square ("RMS") detector. The controller 302 can configure the detector switch 318b to couple the power meter 320b to either of the test probes 322c, 322d.

In some aspects, either or both of the power meters 320a, 320b, as well as the associated detector switches 318a, 318b and test probes 322c-d, can be omitted.

FIG. 3 also depicts the base station router 202 as including attenuators 326a-d and attenuator path switches 328 in the downlink paths 104a, 104b and attenuators 326e-h and attenuator path switches 328 in the uplink paths 106a, 106b. Attenuators 326c, 326d can equalize the power of downlink signals from different base stations prior to combining the downlink signals at the distribution unit 204. Attenuators 326g, 326h can attenuate the power of uplink signals after the uplink signals have been de-multiplexed by the distribution unit 204 such that the uplink signals are at the signal strength required by the base stations receiving the uplink signals.

In a test mode, the controller 302 can configure the telecommunications system 100 such that downlink signals from the base stations are routed to the attenuators 326a, 326b via the attenuator path switches 328. The attenuators 326a, 326b can attenuate the downlink signals. The attenuated downlink signals can be routed to the terminating resistive loads via the attenuator path switches 328 and the terminating switches 314.

Intermodulation Detection Sub-System in Remote Antenna Unit

Figure 4:
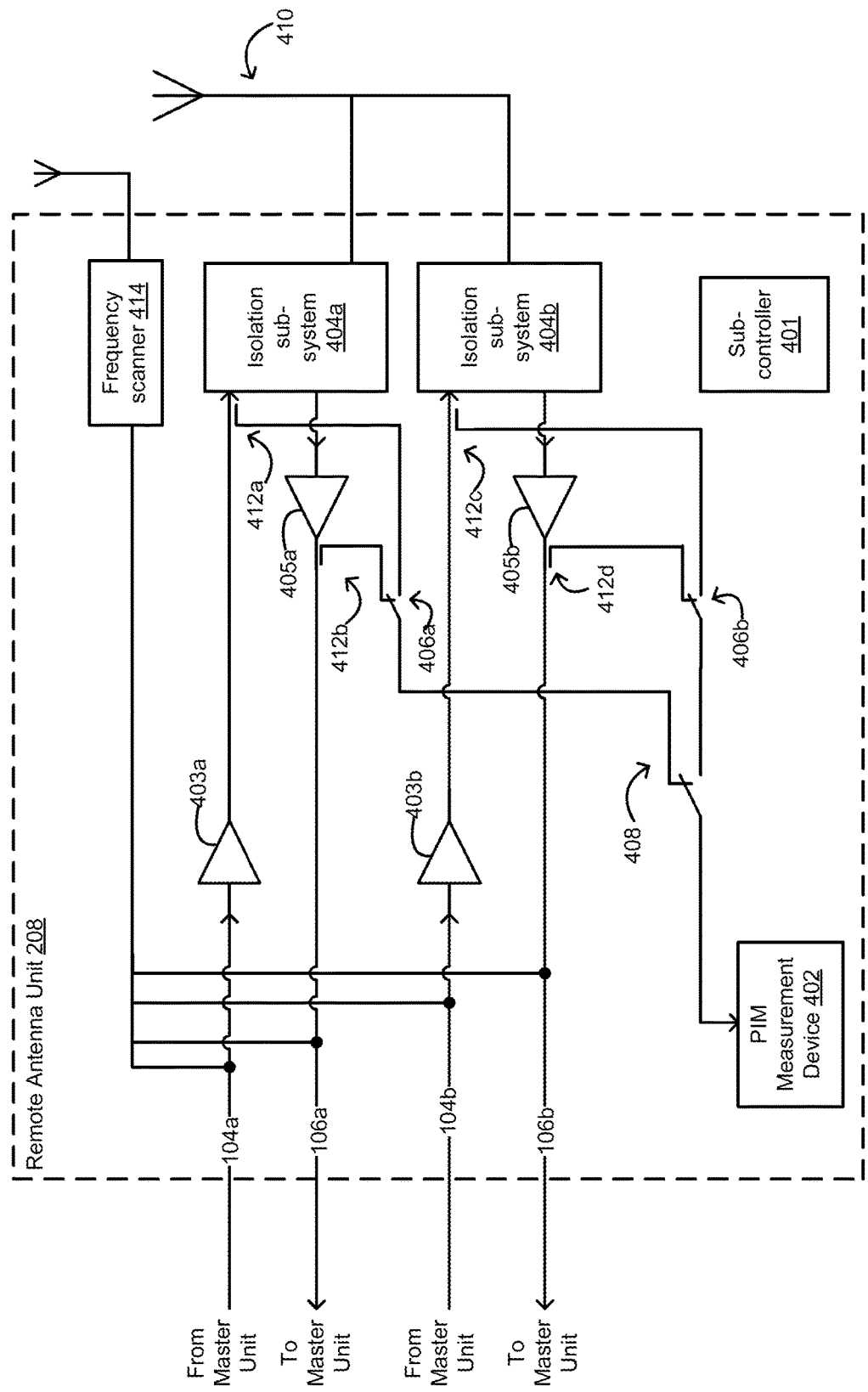
FIG. 4 is a block diagram of a remote antenna unit having a passive intermodulation ("PIM") measurement device of an intermodulation detection sub-system according to one aspect.

In additional or alternative aspects, part of the intermodulation detection sub-system 103 can be integrated into other components of the telecommunications system 100. For example, FIG. 4 depicts an example of a remote antenna unit 208 having a detection and measurement components of the intermodulation detection sub-system 103. The remote antenna unit 208 can include the power amplifiers 403a, 403b, the isolation sub-systems 404a, 404b, the low noise amplifiers 405a, 405b, and an antenna 410. The measurement components of the intermodulation detection sub-system 103 can include a sub-controller 401, a PIM measurement device 402, test switches 406a, 406b, path switch 408, and test probes 412a-d.

The sub-controller 401 can configure the components of the intermodulation detection sub-system 103 integrated into the remote antenna unit 208. An example of a sub-controller 401 is a PIC. The sub-controller 401 can communicate with the components of the intermodulation detection sub-system 103 integrated into the remote antenna unit 208 via, for example, a printed circuit board. The sub-controller 401 can communicate with the controller 302 using control signals communicated via the downlink paths 104a, 104b and uplink paths 106a, 106b.

The remote antenna unit 208 can receive downlink signals via the downlink paths 104a, 104b and provide uplink signals via the uplink paths 106a, 106b. The isolation sub-system 404a can isolate downlink signals traversing the downlink path 104a, transmitted via the antenna 410 from uplink signals traversing the uplink path 106a and recovered via the antenna 410. The isolation sub-system 404b can isolate downlink signals traversing the downlink path 104b from uplink signals traversing the uplink path 106b. The isolation sub-systems 404a, 404b can each include, for example, a duplexer. The isolation sub-systems 404a, 404b can include one or more non-linear interfaces that can generate PIM products.

The PIM measurement device 402 can be coupled to test probes 412a-d via the test switches 406a, 406b and the path switch 408. The test probes 412a, 412b can receive a signal to be measured from the downlink path 104a or the uplink path 106a, respectively. The test probes 412c, 412d can receive a signal to be measured from the downlink path 104b and the uplink path 106b, respectively. The PIM measurement device 402 can receive the signal to be measured via the path switch 408.

In a test mode, the controller 302 can configure the intermodulation detection sub-system 103 via a sub controller to couple the path switch 408 to test probes 412a, 412b or to test probes 412c, 412d. The controller 302 can configure the intermodulation detection sub-system 103 via the sub controller to couple the test switch 406a to either of the test probes 412a, 412b. The controller 302 can configure the intermodulation detection sub-system 103 to couple the test switch 406a to either of the test probes 412c, 412d.

The PIM measurement device 402 can detect and measure PIM products in signals traversing the downlink paths 104a, 104b by measuring a signal received via the test probes 412a, 412c respectively. The PIM products in the downlink paths 104a, 104b can be generated by components in the downlink paths 104a, 104b prior to the isolation sub-systems 404a, 404b. Components in the downlink paths 104a, 104b that can generate PIM products can include, for example, the power amplifiers 403a, 403b.

When the controller 302 configures the intermodulation detection sub-system 103 to measure a signal received via the test probes 412b, 412d, the PIM measurement device 402 can detect and measure PIM products in signals traversing the uplink paths 106a, 106b after low noise amplifiers 405a, 405b. The PIM products in the uplink paths 106a, 106b can also include PIM products from the downlink paths 104a, 104b.

In some aspects, the PIM measurement device 402 can be used as a spectrum analyzer to measure signals prior to isolation sub-system 404a using test probes 412a-b and subsequent to isolation sub-system 404a using a test probe (not shown). Furthermore, test probes 412a, 412c can be used to measure intermodulation and/or internal PIM products generated from the system. Because of downlink and uplink isolation, internal intermodulation can be determined using test probes 412b, 412d and PIM measurement device 402. Test probes 412b, 412d can be used to measured a composite (i.e. external and internal) PIM. Using the internal intermodulation determined using test probes 412b, 412d, exclusively external PIM can be measured. In some aspects, the PIM measurement device 402 can be used as a pilot generator to measure other system characteristics, such as uplink gain. In other aspects, the PIM measurement device can be configured to digitally sample and process a measurement signal.

Although the intermodulation detection sub-system 103 is depicted in FIGS. 3 and 4 as including a test signal generator 304 integrated into the base station router 202 and a PIM measurement device 402 integrated into a remote antenna unit 208, these PIM measurement sub-system components can be integrated in other devices of the telecommunications system. For example, in some aspects, both the test signal generator 304 and the PIM measurement device 402 can be integrated into a remote antenna unit 208.

The remote antenna unit 208 can also include a frequency scanner 414 for distinguishing extraneous signals from PIM products. Extraneous signals can include signals from other wireless devices in the coverage area of the remote antenna unit 208. The frequency scanner 414 can include an antenna and a spectrum analyzer. In some aspects, the frequency scanner 414 can communicate with the controller 302 using control signals transmitted via one or more of the uplink and downlink paths. In other aspects, the frequency scanner can communicate with the controller 302 using control signals transmitted via a control path. The controller 302 can configure the frequency scanner 414 to detect extraneous signals using an antenna separate from the antenna 410. The frequency scanner to 314 can determine the frequencies of any detected extraneous signals.

The controller 302 can detect the presence of any extraneous signals in the coverage area of the remote antenna unit 208 at the same frequencies as any PIM products generated by mixing of the signal components of the test signal. By determining if any extraneous signals have the same frequencies as the PIM products, the controller 302 can distinguish the PIM products in the uplink paths 106a, 106b from any extraneous signals. In some aspects, the intermodulation detection sub-system 103 can identify the frequencies of extraneous signals prior to generating the test signal. The controller 302 can select test signal frequencies such that any PIM products will be at frequencies in the uplink frequency band while avoiding frequencies of any extraneous signals in the coverage area of the remote antenna unit 208.

Although the PIM measurement device 402 is depicted as including test probes for two downlink paths and two uplink paths, a PIM measurement device can include test probes for any number of downlink paths and uplink paths. Furthermore, an intermodulation detection sub-system 103, according to some aspects, can be implemented without a frequency scanner.

Figure 5:
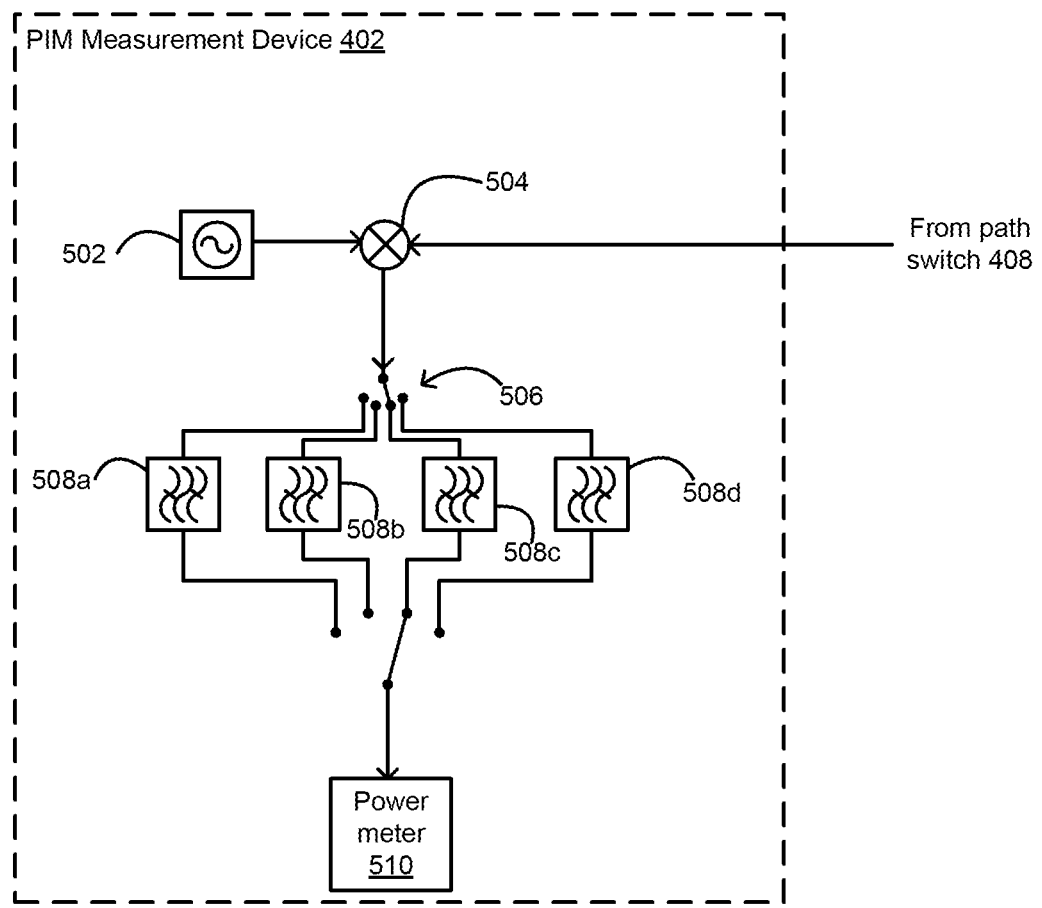
FIG. 5 is a schematic view of a PIM measurement device of an intermodulation detection sub-system according to one aspect.

FIG. 5 schematically depicts an example of the PIM measurement device 402 of the intermodulation detection sub-system 103. The PIM measurement device 402 can include a local oscillator 502, a mixer 504, a filter switch 506, filters 508a-d, and a power meter 510.

The local oscillator 502 and the mixer 504 can receive a signal from a downlink path or an uplink path via the filter switch 506. The local oscillator 502 and the mixer 504 can down-convert the signal to an intermediate frequency.

The filters 508a-d can be included in a switched filter bank. Filters 508a-d can be used to measure characteristics using different bandwidth resolutions. Each of the filters 508a-d in the switched filter bank can pass a different frequency bands at the filtering stage. One of the filters 508a-d can receive the signal via the filter switch 506. The filters 508a-d can filter the signal to isolate any PIM products and minimize noise. The filters 508a-d can cancel or attenuate any signal components of the received signal other than PIM products. Each of the filters 508a-d can pass a different frequency band. One of the filters 508a-d can be selected using the filter switch 506. A filter associated with a given frequency band to be passed can be selected, for example, such that the frequencies corresponding to extraneous signals can be rejected or attenuated. The frequency band to be passed can correspond to the frequency of PIM products included in the signal.

The power meter 510 can receive the signal from one of the filters 508a-d. The power meter can be, for example, a LOG detector or an RMS detector. If the power meter 510 detects a PIM product, the PIM measurement device 402 can output an alarm message identifying the presence of the PIM product to other components of the telecommunication system 100, such as (but not limited to) the base station router 202. The PIM measurement device 402 can provide the alarm message to other components of the telecommunication system 100 via one of the uplink paths 106a, 106b.

In some aspects, the intermodulation detection sub-system 103 can be configured to periodically generate test signals and measure the resulting PIM products. The controller 302 can synchronize the test signal generator 304 and the local oscillator 502 such that the necessary resolution bandwidth for the power meter 510 is minimized. By periodically generating test signals and measuring the resulting PIM products, the intermodulation detection sub-system 103 can distinguish PIM products from noise in the uplink paths 106a, 106b. In other aspects, the test signal generator 304 can generate test signals of sufficient power that any resulting PIM products are at a signal power exceeding the noise floor of the uplink paths 106a, 106b.

Active Detection of Intermodulation Products

Figure 6:
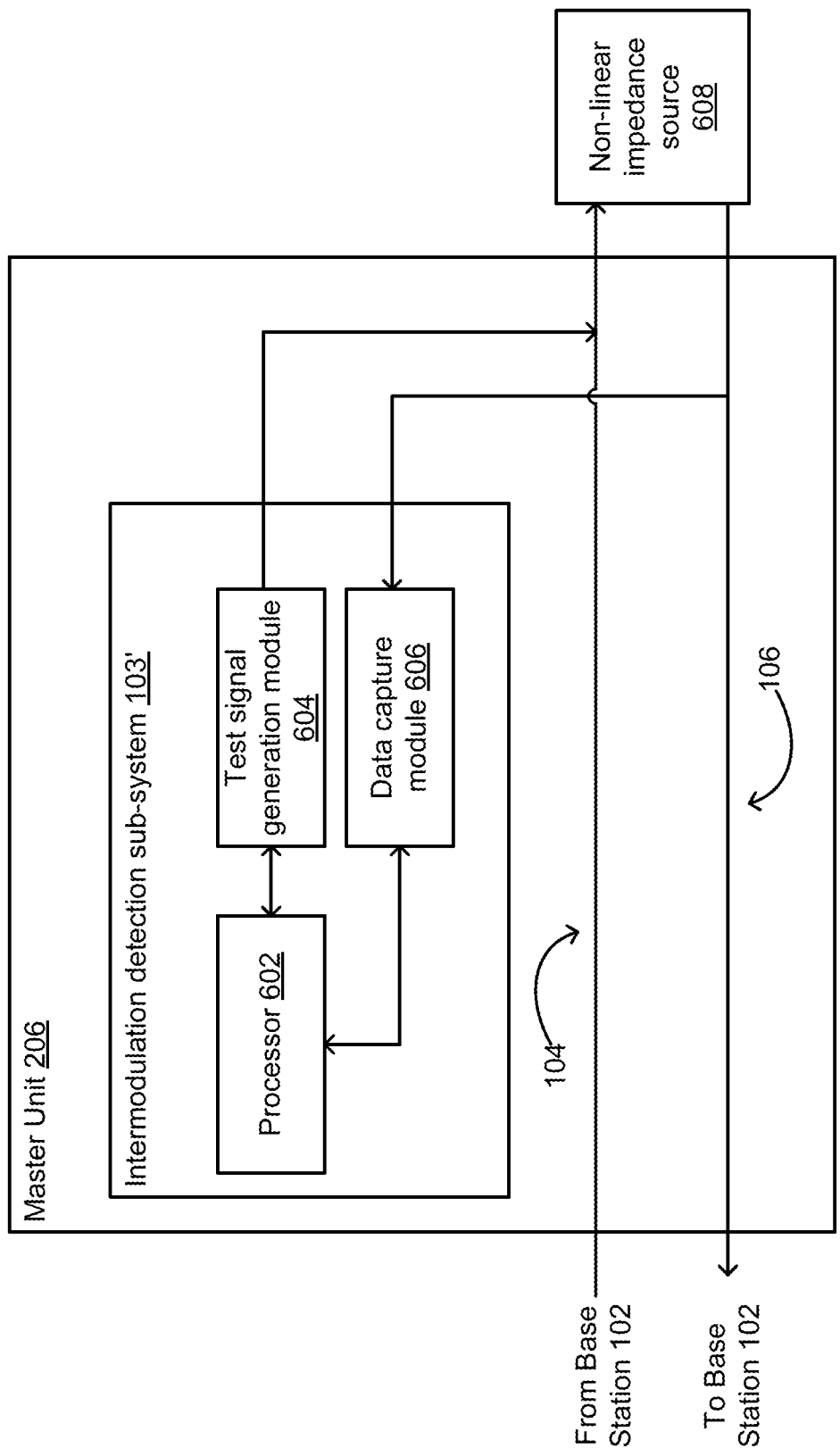
FIG. 6 is a block diagram of an intermodulation detection sub-system configured to perform active detection of intermodulation products according to one aspect.

In additional or alternative aspects, the intermodulation detection sub-system 103' can perform active detection of intermodulation products. For example, FIG. 6 is a block diagram depicting an aspect of an intermodulation detection sub-system 103' configured to perform active detection of intermodulation products. The intermodulation detection sub-system 103' can include a processor 602, a test signal generation module 604, and a data capture module 606.

The intermodulation detection sub-system 103' can detect intermodulation products, such as passive intermodulation products generated by a non-linear impedance source 608. Examples of a non-linear impedance source 608 can include junctions of dissimilar metals in components of a signal path, such as the connections between an antenna and a transmitter. A telecommunications system 100 can include multiple non-linear impedance sources 608, such as the remote antenna units 208a-f.

The processor 602 can be communicatively coupled to the test signal generation module 604 and the data capture module 606. The processor 602 can process data from the test signal generation module 604 and the data capture module 606 to detect intermodulation products in the uplink path 106. Examples of the processor 602 include a microprocessor, a peripheral interface controller ("PIC"), an application-specific integrated circuit ("ASIC"), a field-programmable gate array ("FPGA"), or other suitable processor. The processor 602 may include one processor or any number of processors.

The processor 602 can configure the test signal generation module 604 to generate an analog test signal from a test digital data set. An example of a test signal generation module 604 can include a periodic playback buffer, a digital-to-analog converter, up-conversion circuitry, and a power amplifier. The test signal generation module 604 can be communicatively coupled to the downlink path 104. The test digital data set can represent a digital signal having two test frequencies. The two test frequencies can be selected by the processor 602 such that a linear combination of the test frequencies is a frequency in the uplink frequency band. The test signal generation module 604 can convert the test digital data set to an analog test signal having frequency components for each of the test signal frequencies.

The test signal generation module 604 can provide the analog test signal to the downlink path 104. If the analog test signal encounters a non-linear impedance source 608, PIM products or other intermodulation products can be generated from the signal components of the analog test signal mixing at the non-linear interface of the non-linear impedance source 608. The PIM products can have a frequency within the uplink frequency band. PIM products generated in the downlink path can be provided to the uplink path via reflection by the non-linear impedance source 608 or via recovery by a receiving antenna, such as a remote antenna unit.

The data capture module 606 can be communicatively coupled to the uplink path 106. An example of a data capture module 606 can include a low-noise amplifier, down-conversion circuitry, an analog-to-digital converter, and an averaging capture buffer. Analog signals traversing the uplink path 106 can be received by the data capture module 606. The data capture module 606 can convert signals traversing the uplink path 106 to an uplink digital data set representing a digital uplink signal.

The test signal generation module 604 and the data capture module 606 can be synchronized. Synchronizing the test signal generation module 604 and the data capture module 606 can allow the processor 602 to identify a signal component of a signal traversing the uplink path 106 that is an intermodulation product. The processor 602 can generate a model intermodulation product from the test digital data set that can be mathematically correlated with the intermodulation product in the uplink path 106. The processor 602 can determine that an increase in signal power of an uplink signal detected by the data capture module 606 is mathematically correlated with the model intermodulation product generated using a test signal generated by the test signal generation module 604. An increase in signal power of an signal detected by the data capture module 606 that is mathematically correlated with the model intermodulation product can indicate the presence and signal power of an intermodulation product in the uplink path 106.

Although the intermodulation detection sub-system 103' is depicted in FIG. 2 as being disposed in the master unit 206, other configurations are possible. The intermodulation detection sub-system 103' can be disposed in or integrated with any device in a telecommunications system 100. In some aspects, an intermodulation detection sub-system 103' can be disposed in each of the remote antenna units 208a-f. In other aspects, an intermodulation detection sub-system 103' can be disposed in the master unit 206 and each of the remote antenna units 208a-f. In other aspects, an intermodulation detection sub-system 103' can be disposed in a base station router 202.

Figure 7:
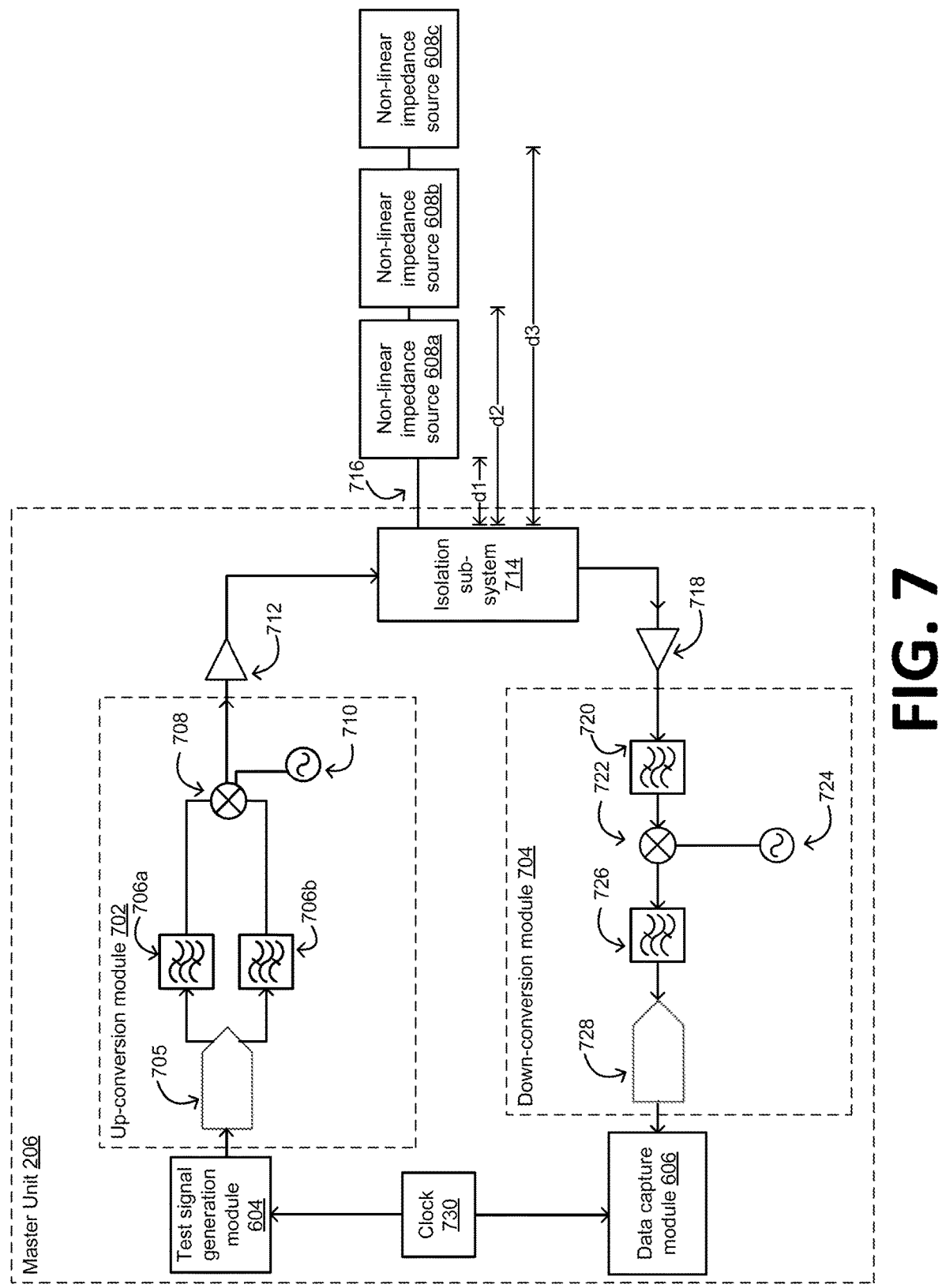
FIG. 7 is a partial schematic diagram of an intermodulation detection sub-system configured to perform active detection of intermodulation products according to one aspect.

FIG. 7 is a partial schematic diagram of an intermodulation detection sub-system 103' configured to perform active detection of intermodulation products according to one aspect. The test signal generation module 604 can generate an analog signal, such as an RF signal, which can include two test signal components. The data capture module 606 can detect the presence of an intermodulation product.

An example of a test signal generation module 604 is a playback buffer, such as a periodic playback buffer. In some aspects, the test signal generation module 604 can be loaded with an L-point data set containing two complex tones, such as $$x[n] = a_1 e^{\frac{2\pi}{L}k_1 n + \theta_2} + a_2 e^{\frac{2\pi}{L}k_2 n + \theta_2},$$

where $a_i$ is the amplitude, $\theta_i$ is the phase, and $k_i$ is the frequency index of the tones. Both of the complex tones can have a periodicity of L samples. The subscripts on the amplitudes, phases, and delays can include two indices. The first index can identify the tone. The second index can identify delineate the stage of the system. For example, $a_{i,2}$ is the amplitude of a tone i in the second stage.

The test signal generation module 604 can provide the data set x[n] to an up-conversion module 702. An example up-conversion module 702 depicted in FIG. 7 is a complex modulator. The up-conversion module 702 can include a digital-to-analog converter 705, filters 706a, 706b, a mixer 708, and a local oscillator 710. The up-conversion module 702 can up-convert complex tones to an RF frequency. The complex tones can be amplified by a power amplifier 712. The output of the power amplifier 712 can be an analog signal represented by the function $$x(t) = a_{1,2} \cos(2\pi f_2 t + \theta_{1,2}) + a_{2,2} \cos(2\pi f_2 t + \theta_{2,2}) + d_{t,2} \cos(2\pi f_n t + \varphi_{t,2}).$$

Each of the frequencies $f_i$ can be represented by the function $$f_1 = f_{tx} + \frac{f_s}{L} k_i,$$

where $f_s$ is the sample rate and $f_{tx}$ is the local oscillator frequency. The analog signal can be provided to a transmission line 716 via the downlink side of an isolation sub-system 714, such as (but not limited to) a duplexer.

In addition to the two tones, the analog signal outputted from the power amplifier 712 can include intermodulation products generated by the up-conversion module 702 and the power amplifier 712. The frequencies $f_n$ of the intermodulation products can be represented by the function $$f_n = \frac{n+1}{2} f_1 + \frac{n-1}{2} f_2$$

with a phase of $\varphi_{t,2}$.

The frequencies of the complex tones, $f_1$ and $f_2$, can be selected such that the complex tones can be provided to the transmission line 716 via the downlink side of the isolation sub-system 714 without being significantly attenuated. The desired intermodulation product $f_n$ to be measured is significantly attenuated by downlink side of the isolation sub-system 714. The desired intermodulation product $f_n$ to be measured is not significantly attenuated by the uplink side of the isolation sub-system 714.

A signal generated from the complex tones can be provided to the transmission line 716 via the downlink side of the isolation sub-system 714. The signal at the output of the isolation sub-system 714 can be represented by the function $$x_f(t) = a_{1,3} \cos(2\pi f_1 t + \theta_{1,3}) + a_{2,3} \cos(2\pi f_2 t + \theta_{2,3}).$$

The complex signal can traverse the transmission line 716 from the output of the isolation sub-system 714 to one or more points of non-linear discontinuities. The one or more points of non-linear discontinuities are represented in FIG. 7 as non-linear impedance sources 608a-c. A nonlinear discontinuity physically located at points $pt_i$ at a distance of $d_i$ meters from the isolation sub-system 714 can delay the signal traversing the transmission line, as represented by the function $$x_i(t) = a_i(a_{1,3} \cos(2\pi f_1 (t - \tau_i) + \theta_{1,3}) + a_{2,3} \cos(2\pi f_2 (t - \tau_i) + \theta_{2,3})),$$

where the signal has been delayed by $$\tau_1 = \frac{d_i}{(vf \times c)}$$

for a velocity factor $vf$ and the speed of light $c$ and attenuated by a factor of $a_i$ caused by losses in the transmission line.

At points $pt_i$ having nonlinear discontinuities, the complex signal can interact with the nonlinear discontinuities to generate intermodulation products represented by the function $y_i(t) = b_{i,4} \cos(2\pi f_n (t - \tau_i) + \phi_{i,4})$, where $b_{i,4}$ is the amplitude of the associated $n^{th}$ order intermodulation product. The intermodulation products can traverse the transmission line 716 in a direction away from the isolation sub-system 714 and in a direction toward the isolation sub-system 714. Intermodulation products traversing the transmission line 716 in a direction away from the isolation sub-system 714 can be sufficiently small that other signals communicated via the telecommunications system 100 are not distorted.

Intermodulation products traversing the transmission line 716 in a direction toward the isolation sub-system 714 can combine with additional noise received by the telecommunications system 100. The intermodulation products combined with noise can be represented by the function $$y_r(t) = \sum_{i=1}^{P} b_{i,3} \cos(2\pi f_n (t - 2\tau_i) + \varphi_{i,3}) + e_3(t),$$

where $e_3(t)$ is the noise.

The intermodulation products can be provided to the uplink path 106 via the isolation sub-system 714 and the low noise amplifier 718. The intermodulation products at the uplink output of the isolation sub-system 714 can be represented by the function $$y(t) = \sum_{i=1}^{P} b_{i,2} \cos(2\pi f_n (t - 2\tau_i) + \phi_{i,2}) + d_{r,2} \cos(2\pi f_n t + \varphi_{r,2}) + e_2(t).$$

where the terms $b_{i,2}$ are associated with the nonlinear discontinuities in the RF subsystem, the term $d_{r,2}$ is associated with the intermodulation generated in the power amplifier 712 that is not completely removed by the isolation sub-system 714, and $e_3(t)$ is the received noise.

A down-conversion module 704 can down-convert the uplink signal including intermodulation products to an intermediate frequency ("IF"). The down-conversion module 704 can include a filter 720, a mixer 722, a local oscillator 724, a filter 726, and an analog-to-digital converter 728. The analog-to-digital converter 728 can sample the uplink signal including the intermodulation products. The output of the analog-to-digital converter 728 can be represented by the equation:

$$y[n] = \sum_{i=1}^{P} b_i \cos\left(2\pi \frac{f_n - f_{rx}}{f_s} n - 4\pi f_n \tau_i + \varphi_i\right) + d_{r,2} \cos\left(2\pi \frac{f_n - f_{rx}}{f_s} n + \varphi r\right) + e_1[n]$$

The tones in the above equation can have the same frequency and can have different amplitudes, delays, and phases.

The test signal generation module 604 and the data capture module 606 can have a common clock 730. The test signal generation module 604 and the data capture module 606 can be synchronized via the clock 730. The test signal generation module 604 and the data capture module 606 can include buffers having the same length. The buffer for the test signal generation module 604 that is outputting sample n can correspond to the buffer for the data capture module 606 that is recording sample n.

The test signal generation module 604 can generate a data set x[n] to drive the digital-to-analog converter 705. The data set x[n] can produce an analog signal to be provided to the downlink path. A processor 602, such as a microprocessor or digital signal processor, can load a playback buffer of the test signal generation module 604 with a length L data set x[0], x[1], . . . x[L−1]. The playback buffer can output data values starting with the value x[0] and continuing to the value x[L−1]. The playback buffer can repeat the data set such that a periodic sequence is generated with a period of L samples.

A capture buffer of the data capture module 606 can use synchronized averaging to capture the data from the analog-to-digital converter 728. The data stored in the capture buffer can be represented by the function $$y_M[n] = \sum_{m=0}^{M-1} y[n + mL]$$

where M is the number of periods over which the average is taken. Using synchronized averaging for each period can allow the intermodulation detection sub-system 103' to distinguish a signal component from a noise component. For example, a date set y[n]=x[n]+e[n] can be composed of a periodic signal component x[n] and a zero-mean ergodic noise component e[n] such that $$y_M[n] = \sum_{m=0}^{M-1} (x[n + mL] + e[n + mL]).$$

The periodic nature of the data set x[n] can allow the data set y[n] to be represented by the function $$y_M[n] = Mx[n] + \sum_{m=0}^{M-1} e[n+mL]$$

such that the signal component is increased by a factor of M and the noise component is not increased by a factor of M. For an ergodic noise component, the data set $y_M[n]$ can be an estimator of the data set $x[n]$, as demonstrated by the function $$\lim_{M\to\infty} \frac{1}{M} y_M[n] =$$

$$x[n] + E\left\{\frac{1}{M}\sum_{m=0}^{M-1} e[n+mL]\right\} = x[n] + \frac{1}{M}\sum_{m=0}^{M-1} E\{e[n+mL]\} = x[n]$$

where $E\{\}$ is an expectation operator. The data captured in the capture buffer can be made arbitrarily close to the periodic component of the signal by averaging a sufficient number of periods. Averaging the periods can allow the intermodulation detection sub-system 103' to detect intermodulation products despite the presence of large amounts of noise in the telecommunications system 100.

To detect intermodulation products, such as passive intermodulation products, in the telecommunications system 100, the playback buffer of the test signal generation module 604 can be loaded with two tones. Any value can be used for the respective phases $\theta_1$ and $\theta_2$ of the tones. For a zero value of the phases $\theta_1$ and $\theta_2$, the tones can be loaded as a data set $x[n]$ represented by the function $$x[n] = a_1 e^{\frac{2\pi}{L}k_1 n_1} + a_2 e^{\frac{2\pi}{L}k_2 n}.$$

The amplitudes $a_1$ and $a_2$ can be set such that the amplitudes of the two tones at the output of the isolation sub-system 714, $a_{1,3}$ and $a_{2,3}$, are equal.

The data set sampled by an averaging capture buffer of the data capture module 606 can be represented by the function $$y[n] =$$

$$\sum_{i=1}^{p} b_i \cos\left(2\pi \frac{f_n - f_{rx}}{f_s} n - 4\pi f_n \tau_i \phi_i\right) + d_{r,2}\cos\left(2\pi \frac{f_n - f_{rx}}{f_s} n + \varphi_r\right) + e_1[n].$$

The frequency of the tones can be represented by the function $$f_n - f_{rx} = (f_{tx} - f_{rx}) + \frac{f_s}{L}\left(\frac{n+1}{2}k_1 - \frac{n-1}{2}k_2\right).$$

Setting the local oscillator 710, the local oscillator 724, and the analog-to-digital converter 728 to a common reference can allow the frequency difference between the local oscillator 710 and the local oscillator 724 to be represented by the function $$f_{tx} - f_{rx} = \frac{f_s}{L}k_c,$$

for some integer $k_c$. The tone frequency for this condition can be represented by the function $$f_n - f_{rx} = \frac{f_s}{L}\left(k_c + \frac{n+1}{2}k_1 - \frac{n-1}{2}k_2\right).$$

The radian frequency of the tones can thus be represented by the function $$w_n = 2\pi \frac{f_n - f_{rx}}{f_s} = \frac{2\pi}{L}\left(k_c + \frac{n+1}{2}k_1 - \frac{n-1}{2}k_2\right).$$

The digital data set captured by the capture buffer of the data capture module 606 can be represented by the function $$y[n] = \sum_{i=1}^{p} b_i \cos(w_n n - 4\pi f_n \tau_i + \phi_i) + d_{r,2}\cos(w_n n + \varphi_r) + e_1[n].$$

The digital data set can be a linear combination of tones having the same frequency such that individual amplitudes $b_i$ are not determined. The sum of multiple tones having the same frequency can be represented by a single tone of the same frequency and scaled in amplitude and phase shifted. Thus, the test digital data set $y[n]$ can be represented as a single tone in Gaussian noise. The maximum likelihood method for estimating the amplitude of a tone in Gaussian noise is to correlate the signal with a complex tone of the same frequency. The maximum likelihood method can thus be represented as $$\hat{b} = \frac{1}{L}\sum_{n=0}^{L-1} y[n]e^{jw_n n}$$

where $\hat{b}$ represents the estimated amplitude of the tone. For a sufficiently small noise value, the statistic $\hat{b}$ can be represented by the function $$\hat{b} = \sum_{n=0}^{L-1} b_i e^{j(4\pi f_n \tau_i + \phi_i)} + d_r e^{j\varphi_r}.$$

The statistic $\hat{b}$ can be used to determine the presence of intermodulation products by comparing the statistic $\hat{b}$ to a predefined threshold.

In additional or alternative aspects, the intermodulation detection sub-system 103' depicted in FIG. 7 can determine the distance from the isolation sub-system 714 and the signal strength for each intermodulation product. The statistic $\hat{b}$ can be computed at different intermodulation frequencies $f_n$. The intermodulation frequencies $f_n$ can be represented as a function of the frequency indexes $k_1$ and $k_2$, as represented by the function $$f_n = f_{tx} + \frac{f_s}{L}\left(\frac{n+1}{2}k_1 - \frac{n-1}{2}k_2\right)$$

where the intermodulation frequency $f_n$ is a linear function of $k_1$ and $k_2$. For the $\psi_1$ and $\psi_2$, represented by the equations $$\psi_{1,i} = \frac{2\pi f_s \tau_i}{L}(n+1) \text{ and } \psi_{2,i} = \frac{2\pi f_s \tau_i}{L}(n-1),$$

the statistic $\hat{b}$ can be represented by the equation $$\hat{b}[k_1, k_2] = \sum_{i=1}^{P} b_i e^{j(\psi_{1,i} k_1 + \psi_{2,i} k_2 + 4\pi f_{tx}\tau_i + \phi_i)} + d_r e^{j\varphi r}.$$

For one frequency index that is a constant and another frequency index that is varied, the test statistic $\hat{b}$ can be a linear combination of complex sinusoids. Thus, the amplitudes $b_1$ and frequencies $\psi_1$ and $\psi_2$ can be determined from the sequence $\hat{b}[k_1,k_2]$. The values can be determined using any suitable technique, such as (but not limited to) the Fourier technique or "super resolution" techniques such as MUSIC and ESPRIT. Time delays associated with the points of nonlinear discontinuity can be determined from one of the frequencies $\psi_1$ and $\psi_2$ depending on the frequency index varied to generate the test statistic sequence. Amplitudes can be estimated from the test statistic using the time delays.

Passive Detection of Intermodulation Products

Figure 8:
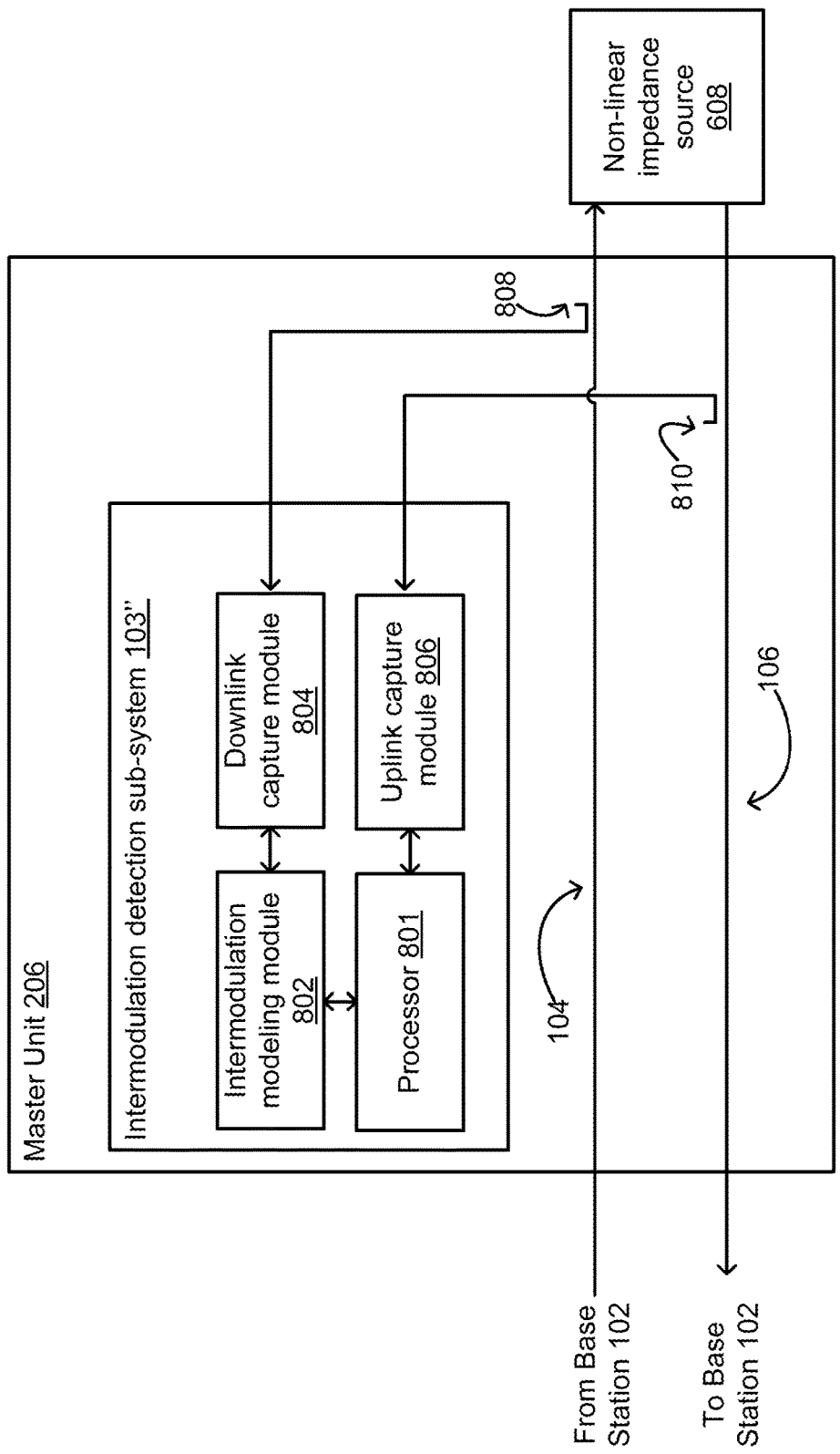
FIG. 8 is a block diagram of an intermodulation detection sub-system configured to perform passive detection of intermodulation products according to one aspect.

In additional or alternative aspects, an intermodulation detection sub-system 103" can be configured to perform passive detection of intermodulation products. FIG. 8 depicts an intermodulation detection sub-system 103" configured to perform passive detection of intermodulation products. The intermodulation detection sub-system 103" can include the processor 801, an intermodulation modeling module 802, a downlink capture module 804, and an uplink capture module 806.

The downlink capture module 804 can be communicatively coupled to the downlink path 104 via a directive coupler 808. The downlink capture module 804 can convert an analog downlink signal coupled from the downlink path 104 to a downlink digital data set representing a downlink signal.

The intermodulation modeling module 802 can apply a non-linear function to the downlink digital data set. Applying the non-linear function to the downlink digital data set can model the effect of the downlink signal generating an intermodulation product in the uplink path 106. The output of the intermodulation modeling module 802 can be a digital data set representing a model intermodulation product.

The uplink capture module 806 can be communicatively coupled to the uplink path 106 via the directive coupler 810. The uplink capture module 806 can convert an analog uplink signal coupled from the uplink path 106 to a digital uplink signal. The output of the uplink capture module 806 can be an uplink digital data set representing a digital uplink signal.

The uplink digital data set from the uplink capture module 806 and digital data set representing the model intermodulation product from the intermodulation modeling module 802 can be provided to the processor 801. The processor 801 can cross correlate the uplink digital data set and the digital data set representing the model intermodulation product. The processor 801 can determine that a mathematical correlation exists between the uplink digital data set and the model intermodulation product, thereby indicating the presence and signal power of an intermodulation product in the uplink path 106.

Figure 9:
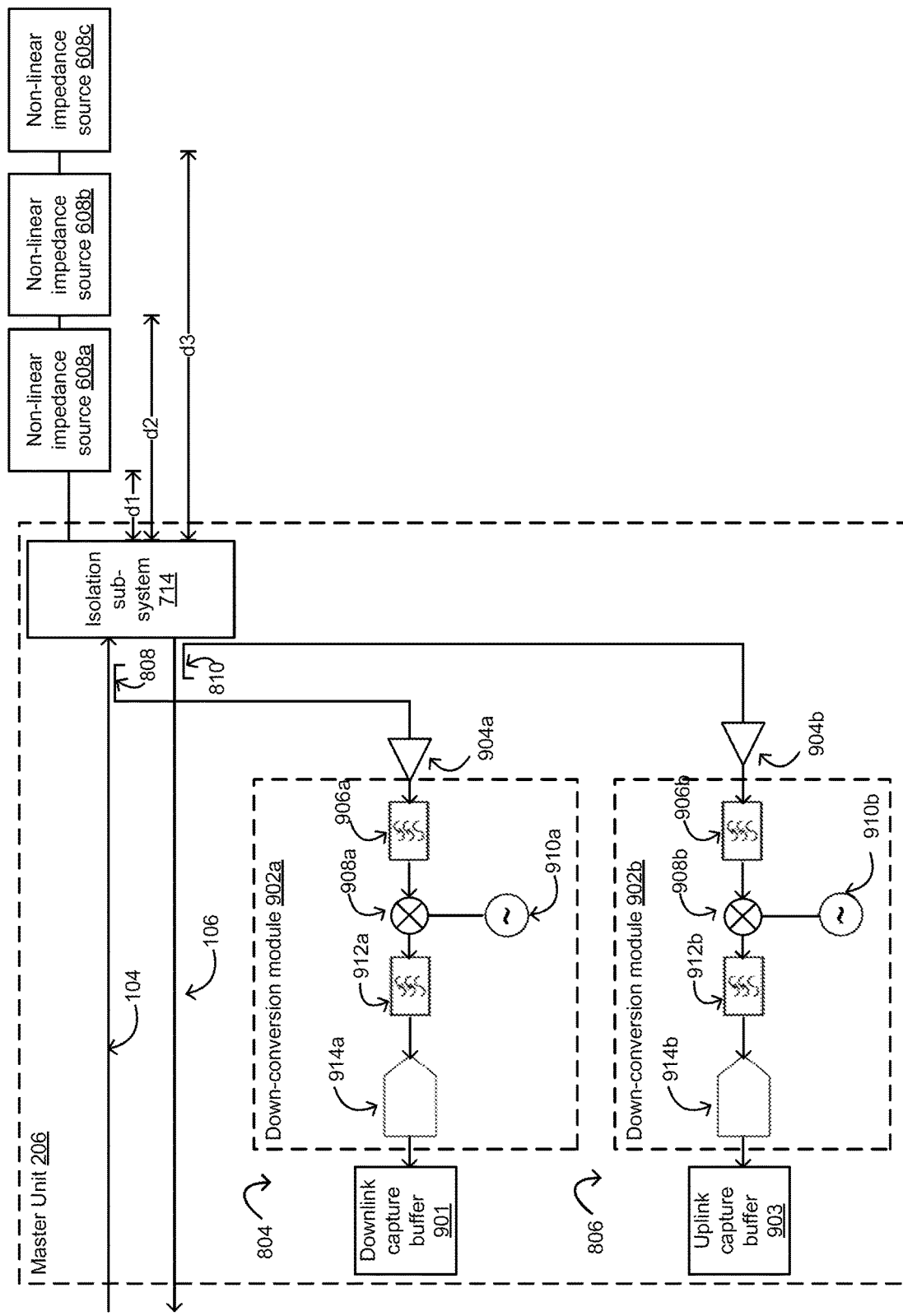
FIG. 9 is a partial schematic diagram of a data capture module of an intermodulation detection sub-system configured to perform passive detection of intermodulation products according to one aspect.

FIG. 9 schematically depicts an example of a downlink capture module 804 and an uplink capture module 806. The downlink capture module 804 can include the downlink capture buffer 901 and the down-conversion module 902a. The down-conversion module 902a can include a low noise amplifier 904a, a filter 906a, a mixer 908a, a local oscillator 910a, a filter 912a, and an analog-to-digital converter 914a. The uplink capture module 806 can include the uplink capture buffer 903 and the down-conversion module 902b. The down-conversion module 902b can include a low noise amplifier 904b, a filter 906b, a mixer 908b, a local oscillator 910b, a filter 912b, and an analog-to-digital converter 914a.

A downlink signal and an uplink signal can be separated and individually sampled via directional couplers 808, 810 coupled to the downlink path 104 and the uplink path 106, respectively. Each of the downlink signal and the uplink signal respectively coupled from the downlink path 104 and the uplink path 106 can be down-converted using mixers 908a, 908b and local oscillators 910a, 910b. The analog-to-digital converters 914a, 914b can synchronously sample the downlink signal and the uplink signal. The downlink capture buffer 901 can store the sampled downlink signal. The uplink capture buffer 903 can store the sampled uplink signal. In some aspects, the respective down-conversion modules 902a, 902b for the downlink signal and the uplink signal can be configured such that the entire downlink frequency band and uplink frequency band are captured. In other aspects, the down-conversion module 902a for the downlink signal can be tuned to a portion of the downlink frequency band that includes signals having a signal power sufficient to produce intermodulation products in the uplink frequency band. The down-conversion module 902b for the uplink signal can be tuned to a portion of the uplink frequency band in which intermodulation products can be present.

Figure 10:
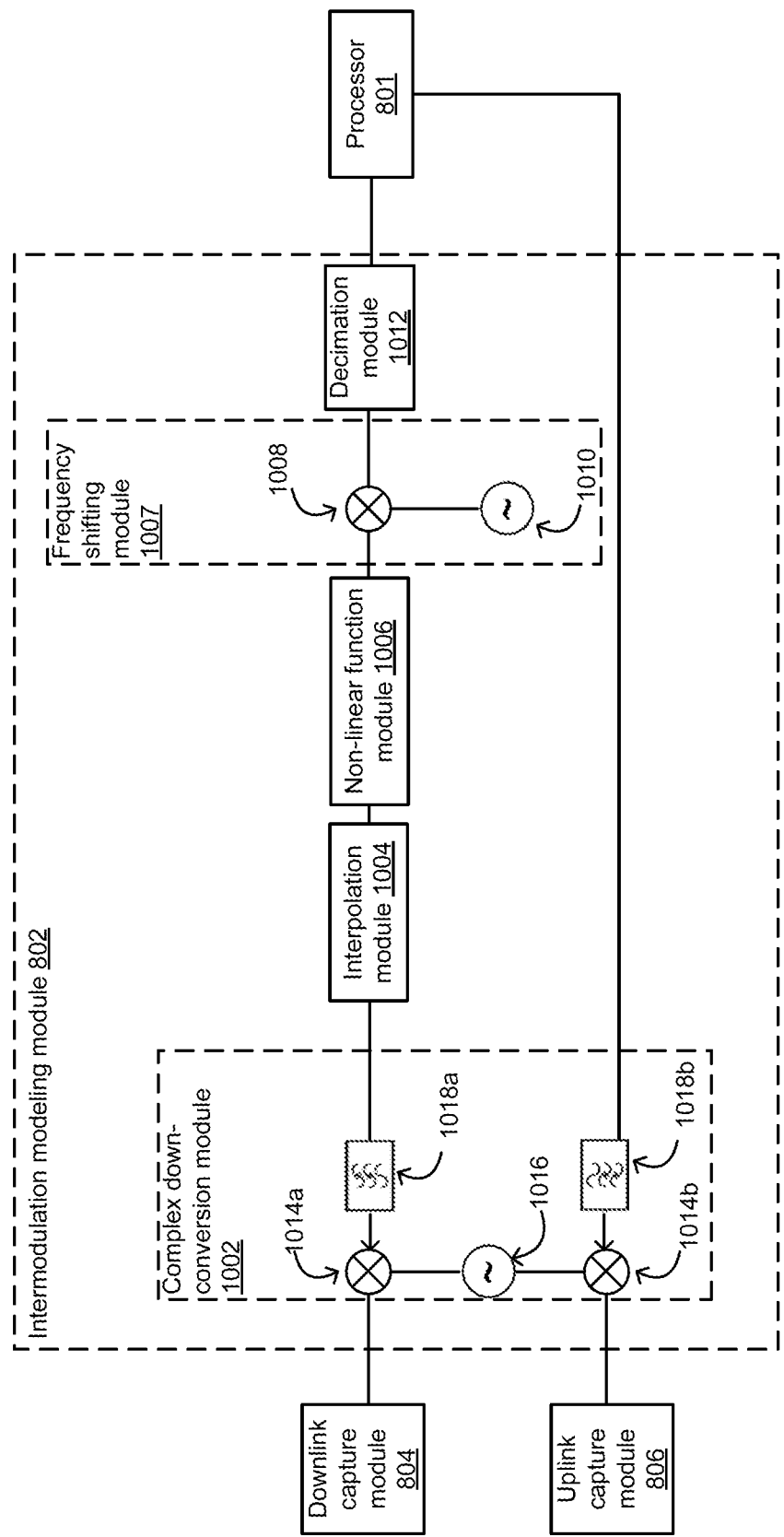
FIG. 10 is a block diagram of a data processing module of an intermodulation detection sub-system configured to perform passive detection of intermodulation products according to one aspect.

FIG. 10 depicts an example of the intermodulation modeling module 802 of an intermodulation detection sub-system 103". The intermodulation modeling module 802 depicted in FIG. 10 can be communicatively coupled to and process data from the downlink capture buffer 901 and the uplink capture buffer 903 depicted in FIG. 9. The intermodulation modeling module 802 depicted in FIG. 10 can include a complex down-conversion module 1002, an interpolation module 1004, a non-linear function module 1006, a frequency-shifting module 1007, a decimator module, and a cross-correlation module.

The complex down-conversion module 1002 can complex down-convert the downlink signal and the uplink signal respectively received from the downlink capture buffer 901 and the uplink capture buffer 903. The complex down-conversion module 1002 can include mixers 1014a, 1014b, a local oscillator 1016, and filters 1018a, 1018b. Complex down-converting the downlink signal and the uplink signal can center the downlink signal and the uplink signal on zero and respectively convert the downlink signal and the uplink signal into a complex downlink signal and a complex uplink signal.

The interpolation module 1004 can interpolate the complex downlink signal by a factor of m such that a non-linear function applied by the non-linear function module 1006 does not cause aliasing.

The non-linear function module 1006 can apply a non-linear function such as $y[n]=|x[n]|^m x[n]$, which models the $m^{th}$ order intermodulation that can occur as a result of nonlinear discontinuities in the telecommunications system 100.

The frequency-shifting module 1007 can shift the frequency of the complex downlink signal such that the intermodulation modeled by the nonlinear function is frequency aligned with intermodulation products generated by the telecommunications system 100 that are included in uplink signals traversing the uplink path 106. The frequency-shifting module 1007 can include a mixer 1008 and a local oscillator 1010.

The decimator module 1012 can decimate the complex downlink signal to an original sample rate. The processor 801 can cross correlate the complex downlink signal with the complex uplink signal. The presence of an intermodulation product in the complex uplink signal can cause the complex downlink signal to be correlated with the complex uplink signal, thereby causing the cross-correlation to have a significant peak. A maximum cross-correlation value can indicate that an intermodulation product is present and can indicate the signal power of the intermodulation product.

The foregoing description, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other examples.

What is claimed is:

1. An intermodulation detection sub-system comprising: a test signal generator integrated into a unit of a repeater system,
   wherein the test signal generator is configured to provide a first test signal to an antenna port via a downlink path of the repeater system, wherein the first test signal has a first set of frequencies for generating a first set of intermodulation products,
   wherein the test signal generator is further configured to provide a second test signal to the antenna port, wherein the second test signal has a second set of frequencies for generating a second set of intermodulation products; and
   an intermodulation detector that is communicatively coupled to an uplink path of the repeater system and configured to detect the first set of intermodulation products and the second set of intermodulation products, wherein the intermodulation detector comprises a filter that is configured in a first mode to isolate the first set of intermodulation products from first signals traversing the uplink path and pass the first set of intermodulation products for detection, wherein the filter is further configured in a second mode to isolate the second set of intermodulation products from second signals traversing the uplink path and pass the second set of intermodulation products for detection.

2. The intermodulation detection sub-system of claim 1, further comprising a processor integrated into the unit and configured to control the operation of the intermodulation detector based on the operation of the test signal generator.

3. The intermodulation detection sub-system of claim 2, wherein the processor is configured to control the operation of the intermodulation detector based on the operation of the test signal generator by synchronizing an operation of the intermodulation detector with an operation of the test signal generator.

4. The intermodulation detection sub-system of claim 1, further comprising a processor configured to:
   detect the first set of intermodulation products by correlating data representing the first set of intermodulation products with data representing the first test signal; and
   detect the second set of intermodulation products by correlating data representing the second set of intermodulation products with data representing the second test signal.

5. The intermodulation detection sub-system of claim 1, wherein the test signal generator is configured to provide the first test signal during a first time period and provide the second test signal during a second time period subsequent to the first time period.

6. The intermodulation detection sub-system of claim 1, wherein the filter comprises a first filter and a second filter, wherein the filter is configured in the first mode to isolate the first set of intermodulation products using the first filter, wherein the filter is configured in the second mode to isolate the second set of intermodulation products using the second filter.

7. The intermodulation detection sub-system of claim 1, wherein the unit of the repeater system comprises a unit of a distributed antenna system.

8. The intermodulation detection sub-system of claim 7, wherein the unit of the distributed antenna system comprises a master unit configured for to communicate with a base station, wherein the antenna port is included in a remote antenna unit communicatively coupled to the master unit and configured to wirelessly communicate with wireless devices.

9. The intermodulation detection sub-system of claim 7, wherein the unit of the distributed antenna system comprises a remote antenna unit configured to wirelessly communicate with wireless devices.

10. The intermodulation detection sub-system of claim 1, wherein the test signal generator is configured to generate the first test signal and the second test signal with a signal power exceeding a noise floor of the uplink path.

11. A method comprising:
    providing, by a test signal generator integrated into a unit of a repeater system, a first test signal to an antenna port via a downlink path of the repeater system, wherein the first test signal has a first set of frequencies for generating a first set of intermodulation products;
    detecting, by an intermodulation detector that is communicatively coupled to an uplink path of the repeater system, the first set of intermodulation products using a filter in a first mode that isolates the first set of intermodulation products from first signals traversing the uplink path and passes the first set of intermodulation products for detection;
    providing, by the test signal generator, a second test signal to the antenna port, wherein the second test signal has a second set of frequencies for generating a second set of intermodulation products; and
    detecting, by the intermodulation detector, the second set of intermodulation products using the filter in a second mode that isolates the second set of intermodulation products from second signals traversing the uplink path and passes the second set of intermodulation products for detection.

12. The method of claim 11, further comprising controlling the operation of the intermodulation detector based on the operation of the test signal generator.

13. The method of claim 12, wherein controlling the operation of the intermodulation detector based on the operation of the test signal generator comprises synchronizing an operation of the intermodulation detector with an operation of the test signal generator.

14. The method of claim 11, further comprising:
detecting the first set of intermodulation products by correlating data representing the first set of intermodulation products with data representing the first test signal;
and detecting the second set of intermodulation products by correlating data representing the second set of intermodulation products with data representing the second test signal.

15. The method of claim 11, wherein the first test signal is provided during a first time period and the second test signal is provided during a second time period subsequent to the first time period.

16. The method of claim 11, wherein the filter comprises a first filter and a second filter, wherein the first mode comprises isolating the first set of intermodulation products using the first filter, wherein the second mode comprises isolating the second set of intermodulation products using the second filter.

17. The method of claim 11, wherein the unit of the repeater system comprises a unit of a distributed antenna system.

18. The method of claim 17, wherein the unit of the distributed antenna system comprises a master unit that communicates with a base station, wherein the antenna port is included in a remote antenna unit communicatively coupled to the master unit and configured to wirelessly communicate with wireless devices.

19. The method of claim 17, wherein the unit of the distributed antenna system comprises a remote antenna unit that wirelessly communicates with wireless devices.

20. The method of claim 11, wherein the first test signal and the second test signal are generated with a signal power exceeding a noise floor of the uplink path.

\* \* \* \* \*